US010787106B2

(12) United States Patent
Sakakibara

(10) Patent No.: US 10,787,106 B2
(45) Date of Patent: Sep. 29, 2020

(54) VEHICLE SEAT MEMBER, VEHICLE SEAT, AND PRODUCTION METHOD THEREFOR

(71) Applicant: SEKISUI PLASTICS CO., LTD., Osaka (JP)

(72) Inventor: Yushi Sakakibara, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 107 days.

(21) Appl. No.: 16/076,582

(22) PCT Filed: Jan. 26, 2017

(86) PCT No.: PCT/JP2017/002654
§ 371 (c)(1),
(2) Date: Aug. 8, 2018

(87) PCT Pub. No.: WO2017/138359
PCT Pub. Date: Aug. 17, 2017

(65) Prior Publication Data
US 2019/0047453 A1 Feb. 14, 2019

(30) Foreign Application Priority Data
Feb. 8, 2016 (JP) .................................. 2016-021648

(51) Int. Cl.
*B60N 2/70* (2006.01)
*B60N 2/90* (2018.01)
(Continued)

(52) U.S. Cl.
CPC ........ *B60N 2/7017* (2013.01); *B29C 44/1271* (2013.01); *B60N 2/90* (2018.02);
(Continued)

(58) Field of Classification Search
CPC .......... B60N 2/7017; B60N 2/90; A47C 7/20; A47C 27/148; A47C 27/15; A47C 27/16;
(Continued)

(56) References Cited

U.S. PATENT DOCUMENTS 6,571,411 B1 6/2003 Ebe
2006/0138714 A1* 6/2006 Suzuki .................... B29C 44/10
264/572
(Continued)

FOREIGN PATENT DOCUMENTS

CN 1333799 1/2002
CN 1839177 9/2006
(Continued)

OTHER PUBLICATIONS

Extended European Search Report dated Jul. 31, 2019 in corresponding European Patent Application No. 17750084.0.
(Continued)

*Primary Examiner* — Milton Nelson, Jr.
(74) *Attorney, Agent, or Firm* — Wenderoth, Lind & Ponack, L.L.P.

(57) ABSTRACT

A method for producing a vehicle seat member in which a frame member having protrusions is integrally molded to a foamed resin molded body is provided. The method comprises an in-mold foam molding step of placing the frame member in a mold, packing prefoamed resin particles, and molding the foamed resin molded body by in-mold foam molding; and a demolding step of removing the mold to obtain the vehicle seat member, wherein in the in-mold foam molding step, the foamed resin molded body is molded so that (B−A)/B is 13/1000 or less, wherein A is an outer dimension of the foamed resin molded body in the vehicle seat member obtained by the demolding step and B is an
(Continued)

inner dimension of the mold corresponding to the outer dimension of the foamed resin molded body.

18 Claims, 6 Drawing Sheets

(51) Int. Cl.
*B29C 44/12* (2006.01)
*B29K 23/00* (2006.01)
*B29K 25/00* (2006.01)
*B29K 105/04* (2006.01)
*B29L 31/58* (2006.01)
*B29L 31/00* (2006.01)

(52) U.S. Cl.
CPC ........ *B29C 44/128* (2013.01); *B29K 2023/06* (2013.01); *B29K 2023/10* (2013.01); *B29K 2025/04* (2013.01); *B29K 2105/04* (2013.01); *B29L 2031/58* (2013.01); *B29L 2031/771* (2013.01)

(58) Field of Classification Search
CPC . B29C 44/1271; B29C 44/128; B29C 44/445; B29K 2023/06; B29K 2023/10; B29K 2025/04; B29K 2105/04; B29L 2031/58; B29L 2031/771
USPC ........................................ 297/DIG. 1, DIG. 2
See application file for complete search history.

(56) References Cited

U.S. PATENT DOCUMENTS

| | | |
|---|---|---|
| 2006/0217452 A1 | 9/2006 | Inada et al. |
| 2012/0126606 A1 | 5/2012 | Takakura et al. |
| 2014/0242335 A1* | 8/2014 | Kondo ................... C08L 51/06 428/141 |
| 2017/0057130 A1 | 3/2017 | Sameshima et al. |
| 2017/0072605 A1 | 3/2017 | Sameshima et al. |
| 2017/0136659 A1 | 5/2017 | Tobimatsu et al. |
| 2017/0252952 A1* | 9/2017 | Takayama .............. B60N 2/646 |

FOREIGN PATENT DOCUMENTS

| | | |
|---|---|---|
| CN | 102469881 | 5/2012 |
| EP | 0 921 960 | 6/1999 |
| EP | 1 160 274 | 12/2001 |
| JP | 58-51123 | 3/1983 |
| JP | 59-38035 | 3/1984 |
| JP | 2591763 | 3/1999 |
| JP | 2001-161508 | 6/2001 |
| JP | 3124213 | 8/2006 |
| JP | WO2009/054212 | 4/2009 |
| JP | 2009-108161 | 5/2009 |
| JP | 2010-12687 | 1/2010 |
| JP | 2012-25908 | 2/2012 |
| JP | 5344395 | 1/2013 |
| JP | 2015-174340 | 10/2015 |
| WO | 98/08703 | 3/1998 |
| WO | 2015/133619 | 9/2015 |
| WO | 2015/159691 | 10/2015 |
| WO | 2016/009820 | 1/2016 |

OTHER PUBLICATIONS

International Search Report dated May 9, 2017 in corresponding International Application No. PCT/JP2017/002654.

\* cited by examiner

VEHICLE SEAT MEMBER, VEHICLE SEAT, AND PRODUCTION METHOD THEREFOR

CROSS-REFERENCE TO RELATED APPLICATIONS

This application is a national stage application, filed under 35 U.S.C. § 371, of International Patent Application No. PCT/JP2017/002654, filed on Jan. 26, 2017, which claims the benefit of Japanese Patent Application No. 2016-021648, filed Feb. 8, 2016, each of which is incorporated by reference herein in its entirety.

TECHNICAL FIELD

The present invention relates to a vehicle seat member, vehicle seat, and a production method therefor.

BACKGROUND ART

As a vehicle seat of an automobile and the like, a vehicle seat comprising at least a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body is known. Moreover, a vehicle seat further having an upper seat member stacked on an upper part of such a vehicle seat member, the upper seat member comprising a cushion material elastically deforming upon application of a load, and the vehicle seat member being made of a foamed resin molded body with compression strength higher than that of the upper seat member is also known.

JP Utility Model Registration No. 2591763 and JP Patent No. 5344395 describe a vehicle seat of the aforementioned form in which a recess groove or a notch along a shape of the frame member is formed on a rear surface side of the vehicle seat member, and the frame member is inserted into the recess groove or the notch and fixed. In the vehicle seat of this form, a position of the frame member cannot be firmly fixed with respect to the vehicle seat member easily, and dislocation or a noise caused by the dislocation can occur in some cases. Moreover, fixation of the vehicle seat to the vehicle body can easily become difficult due to the dislocation.

As a vehicle seat which can solve such a disadvantage, JP Unexamined Patent Publication No. 2001-161508 and International Publication WO 2015/159691 describe a vehicle seat in which the frame member can be integrally molded to the vehicle seat member at molding. The vehicle seat of this form has the following advantage: the frame member is integrally molded inside the vehicle seat member which is a foamed resin molded body and thus, dislocation of the frame member in the vehicle seat member can be avoided.

SUMMARY OF INVENTION

Technical Problem

In the vehicle seats described in JP Unexamined Patent Publication No. 2001-161508 or International Publication WO 2015/159691, the frame member is integrally molded inside the foamed resin molded body constituting the vehicle seat member, and therefore it has the following advantage: dislocation of the frame member does not occur easily. However, usually, the foamed resin molded body has a property of shrinking slightly after being demolded, and thus the frame member, which is usually a wire, will unavoidably deform along with the shrinkage of the foamed resin molded body, though the amount of the deformation is very small. By means of the deformation, the position of the protrusion functioning as a fixing portion to a vehicle body is also slightly displaced from an initial position. In the current vehicles or particularly in automobiles, high dimensional accuracy is in demand, and reduction of the amount of a change in the position of the protrusion generated after foamed molding is considered to be a problem to be solved in order to improve assembling accuracy.

The inventors have also found the following new problem: since the foamed resin molded body in which the frame member is integrally molded inside as the vehicle seat member can interfere with the frame member when the foamed resin molded body shrinks after being demolded, a dimensional change after the demolding is complicated as compared with a molded body not containing the frame member but made only of a foamed resin, and controlling the dimension after the demolding is difficult.

The inventors have also found the following further new problem: if the foamed resin molded body's strength of holding a base end portion of the protrusion and the body portion is not sufficient in the vehicle seat member, the base end portion and the body portion are relatively moved with respect to the foamed resin molded body when the protrusion is fastened to the vehicle body, and the vehicle seat member and the vehicle body cannot be fastened with sufficient strength.

Solution to Problem

A first aspect of the present invention relates to a method for producing a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body, comprising:

an in-mold foam molding step of placing the frame member in a mold so that the body portion is located inside the mold, packing prefoamed resin particles obtained by prefoaming foamable resin particles comprising a resin and a foaming agent and then, foaming the prefoamed resin particles in the mold to mold the foamed resin molded body; and a demolding step of removing the mold to obtain the vehicle seat member, wherein in the in-mold foam molding step, the foamed resin molded body is molded so that (B−A)/B is 13/1000 or less, wherein A is an outer dimension of the foamed resin molded body in the vehicle seat member obtained by the demolding step and B is an inner dimension of the mold corresponding to the outer dimension.

According to the first aspect of the present invention, since a dimensional change in a production step of the foamed resin molded body is suppressed, the vehicle seat member with a reduced amount of a change in the position of the protrusion can be produced as compared with the case where (B−A)/B exceeds 13/1000. Moreover, since the dimensional change after being demolded is small though the foamed resin molded body has the frame member integrally molded therein, a vehicle seat member having high dimensional accuracy can be produced.

In the first aspect of the present invention, in the in-mold foam molding step, the foamed resin molded body is preferably molded so that (B−A)/B is 2.5/1000 or more and 13/1000 or less. In this case, the vehicle seat member in which the base end portion of the protrusion and the body portion in the frame member are held by the foamed resin molded body surrounding them with sufficient strength as a result of shrinkage of the foamed resin molded body in the production step can be produced. The vehicle seat member produced in this method can be reliably fastened to the vehicle body through the protrusion.

A second aspect of the present invention relates to a method for producing a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body, comprising:

an in-mold foam molding step of placing the frame member in a mold so that the body portion is located inside the mold, packing prefoamed resin particles obtained by prefoaming foamable resin particles comprising a resin and a foaming agent and then, foaming the prefoamed resin particles in the mold to mold the foamed resin molded body; and a demolding step of removing the mold to obtain the vehicle seat member, wherein the in-mold foam molding step is a step of molding the foamed resin molded body so that an expansion ratio is 10 to 60 times and a fusion rate between the foamed particles derived from the prefoamed resin particles is 50 to 100%; and the resin is a resin such that when a standard foamed resin molded body is produced by in-mold foam molding by using a standard mold having a cavity with a predetermined shape so that the expansion ratio and the fusion rate are obtained, and removing the standard mold, (D−C)/D is 13/1000 or less, wherein C is an outer dimension of the standard foamed resin molded body and D is an inner dimension of the standard mold corresponding to the outer dimension.

As described above, the foamed resin molded body in which the frame member is integrally molded inside can interfere with the frame member when the foamed resin molded body shrinks after being demolded and thus, it has the following problem: a dimensional change after the demolding is complicated as compared with the molded body not containing the frame member but made only of the foamed resin, and controlling the dimension of a completed product is difficult. In the second aspect of the present invention, by using a resin with a small dimensional change, when a plurality of vehicle seat members are to be produced, a difference in the dimension of each foamed resin molded body in the individual vehicle seat members can be made smaller. Therefore, according to the second aspect of the present invention, the production yield of the vehicle seat member having the foamed resin molded body with a targeted dimension can be improved.

Moreover, according to the second aspect of the present invention, since the dimensional change in the production step of the foamed resin molded body is suppressed, the vehicle seat member in which the amount of a change in the position of the protrusion is reduced can be produced as compared with the case where (D−C)/D exceeds 13/1000.

In the second aspect of the present invention, the resin having (D−C)/D of 2.5/1000 or more and 13/1000 or less is preferably used. In this case, the vehicle seat member in which the base end portion of the protrusion and the body portion in the frame member are held by the foamed resin molded body surrounding them with sufficient strength as a result of shrinkage of the foamed resin molded body in the production step can be produced. The vehicle seat member produced in this method can be reliably fastened to the vehicle body through the protrusion.

In the first aspect and the second aspect of the present invention, it is preferable that the foamed resin molded body is substantially rectangular on a plan view, the body portion of the frame member partially has a portion lying along a longer-side direction of the foamed resin molded body, and the protrusion is formed on the portion lying along the longer-side direction of the body portion. When the foamed resin molded body is substantially rectangular on the plan view, the amount of shrinkage in the longer-side direction is larger than that in a shorter-side direction. In the vehicle seat in which the protrusion is formed on the portion of the body portion lying along the longer-side direction where the amount of shrinkage is larger, the effect of the present invention is exerted more clearly.

A third aspect of the present invention relates to a method for producing a vehicle seat comprising the vehicle seat member and an upper seat member placed on an upper part of the vehicle seat member, the upper seat member comprising a cushion material elastically deforming upon application of a load, and the foamed resin molded body in the vehicle seat member having compression strength higher than that of the upper seat member, comprising:

a vehicle seat member production step of producing the vehicle seat member by a method according to the first aspect or the second aspect of the present invention; and a vehicle seat production step of producing the vehicle seat by placing the upper seat member on an upper part of the vehicle seat member obtained by the vehicle seat member production step.

According to the method of the third aspect of the present invention, a comfortable sense of elasticity can be given to a seated person by the upper seat member, and deformation of the vehicle seat more than necessary can be prevented by the vehicle seat member, whereby the vehicle seat having comfortableness and safety can be obtained.

A fourth aspect of the present invention relates to a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body, wherein the foamed resin molded body is obtained by in-mold foam molding by using a mold; and (B−A)/B is 13/1000 or less, wherein A is an outer dimension of the foamed resin molded body and B is an inner dimension of the mold corresponding to the outer dimension.

Since the vehicle seat member according to the fourth aspect of the present invention has a small dimensional change in a production step of the foamed resin molded body, an amount of a change in the position of the protrusion is small as compared with the case where (B−A)/B exceeds 13/1000. Moreover, since the vehicle seat member according to this aspect has a small dimensional change in the production step of the foamed resin molded body, it has high dimensional accuracy regardless of integral molding of the frame member inside the foamed resin molded body.

In the vehicle seat member according to the fourth aspect of the present invention, moreover, the above defined (B−A)/B is preferably 2.5/1000 or more and 13/1000 or less. Since the base end portion of the protrusion and the body portion in the frame member are held by the foamed resin molded body surrounding them with sufficient strength as a result of shrinkage of the foamed resin molded body in the production step, this vehicle seat member can be reliably fastened to the vehicle body through the protrusion.

A fifth aspect of the present invention relates to a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body, wherein the foamed resin molded body is obtained by packing prefoamed resin particles obtained by prefoaming foamable resin particles comprising a resin and a foaming agent into a mold followed by in-mold foam molding;

in the foamed resin molded body, an expansion ratio is 10 to 60 times and a fusion rate between the foamed particles derived from the prefoamed resin particles is 50 to 100%; and the resin is a resin such that when a standard foamed resin molded body is produced by in-mold foam molding by using a standard mold having a cavity with a predetermined shape so that the expansion ratio and the fusion rate are obtained, and removing the standard mold, (D−C)/D is 13/1000 or less, wherein C is an outer dimension of the standard foamed resin molded body and D is an inner dimension of the standard mold corresponding to the outer dimension.

Since the vehicle seat member according to the fifth aspect of the present invention has a small dimensional change in a production step of the foamed resin molded body, the amount of a change in the position of the protrusion is small as compared with the case where the above defined (D−C)/D exceeds 13/1000. Moreover, since the vehicle seat member according to this aspect has a small dimensional change in the production step of the foamed resin molded body, it has high dimensional accuracy regardless of integral molding of the frame member inside the foamed resin molded body.

The vehicle seat member according to the fifth aspect of the present invention further preferably comprises a foamed resin molded body made of a resin having the above defined (D−C)/D of 2.5/1000 or more and 13/1000 or less. Since the base end portion of the protrusion and the body portion in the frame member are held by the foamed resin molded body surrounding them with sufficient strength as a result of shrinkage of the foamed resin molded body in the production step, this vehicle seat member can be reliably fastened to the vehicle body through the protrusion.

A sixth aspect of the present invention relates to a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body, wherein the foamed resin molded body is a foamed molded body of a composite resin comprising a polystyrene-based resin and a polyolefin-based resin or a foamed molded body of the polystyrene-based resin.

Since the vehicle seat member according to the sixth aspect of the present invention has a small dimensional change in a production step of the foamed resin molded body, the amount of a change in the position of the protrusion is small as compared with the case where the foamed resin molded body made of other resins is included. Moreover, since the vehicle seat member according to this aspect has a small dimensional change in the production step of the foamed resin molded body, it has high dimensional accuracy regardless of integral molding of the frame member inside the foamed resin molded body. Moreover, since the base end portion of the protrusion and the body portion in the frame member are held by the foamed resin molded body surrounding them with sufficient strength as a result of shrinkage of the foamed resin molded body in the production step, the vehicle seat member according to the sixth aspect of the present invention can be reliably fastened to the vehicle body through the protrusion.

In the fourth aspect, the fifth aspect, and the sixth aspect of the present invention, it is preferable that the foamed resin molded body is substantially rectangular on a plan view, the body portion of the frame member partially has a portion lying along a longer-side direction of the foamed resin molded body, and the protrusion is formed on the portion lying along the longer-side direction of the body portion. When the foamed resin molded body is substantially rectangular on the plan view, the amount of shrinkage in the longer-side direction is larger than that in a shorter-side direction. In the vehicle seat in which the protrusion is formed on the portion of the body portion lying along the longer-side direction where the amount of shrinkage is larger, the effect of the present invention is exerted more clearly.

A seventh aspect of the present invention relates to a vehicle seat comprising the vehicle seat member according to the fourth aspect, the fifth aspect, or the sixth aspect of the present invention and an upper seat member placed on an upper part of the vehicle seat member, the upper seat member comprising a cushion material elastically deforming upon application of a load, and the foamed resin molded body in the vehicle seat member having compression strength higher than that of the upper seat member.

The vehicle seat according to the seventh aspect of the present invention can give a comfortable sense of elasticity to a seated person by the upper seat member, and deformation of the vehicle seat more than necessary can be prevented by the vehicle seat member, whereby the vehicle seat having comfortableness and safety can be obtained.

Advantageous Effects of Invention

The present invention provides a vehicle seat member and a vehicle seat which sufficiently satisfy high mounting accuracy to a vehicle body that has been in demand in recent years, and a production method therefor.

According to an aspect of the present invention, in a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body, displacement of the protrusion in the frame member which is a fixing portion to the vehicle body can be reduced.

According to an aspect of the present invention, in production of a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion and having a tip end that protrudes outward from the foamed resin molded body, the vehicle seat member having a targeted dimension can be produced efficiently.

DESCRIPTION OF EMBODIMENTS

Figure 1:
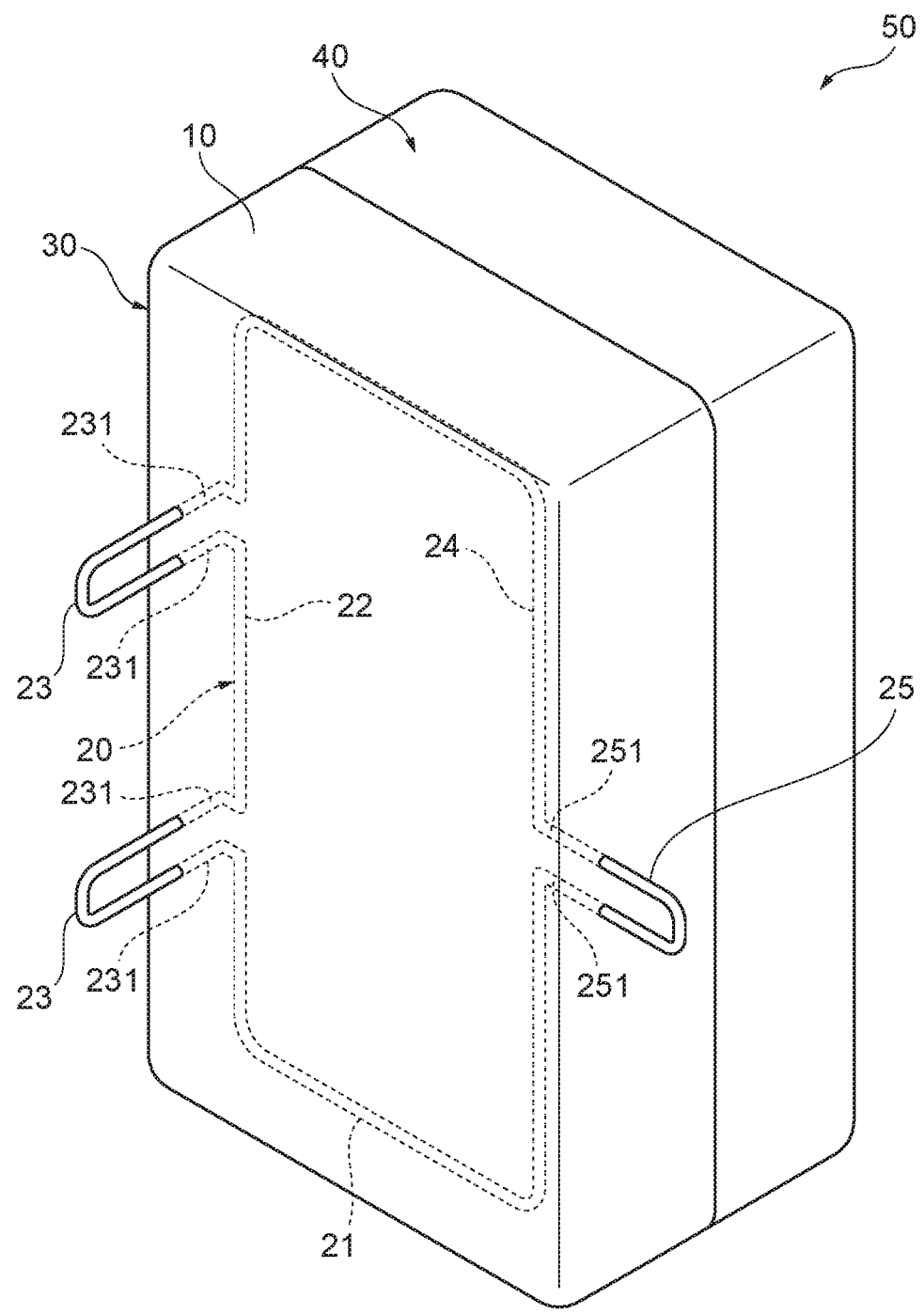
FIG. 1 is a perspective view illustrating an embodiment of a vehicle seat according to the present invention.
Figure 2:
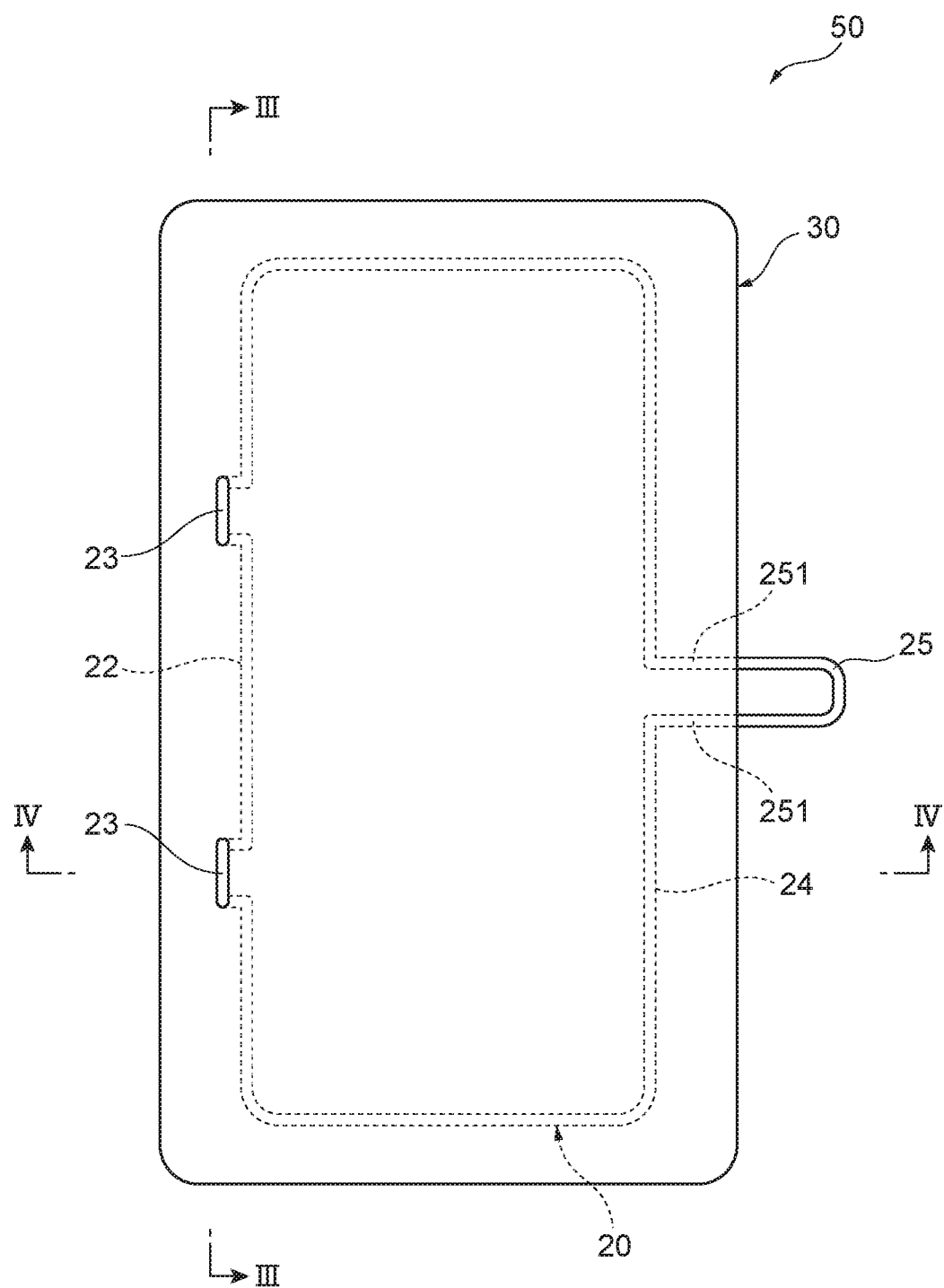
FIG. 2 is a view of the vehicle seat illustrated in FIG. 1 when seen from a bottom surface.
Figure 3:
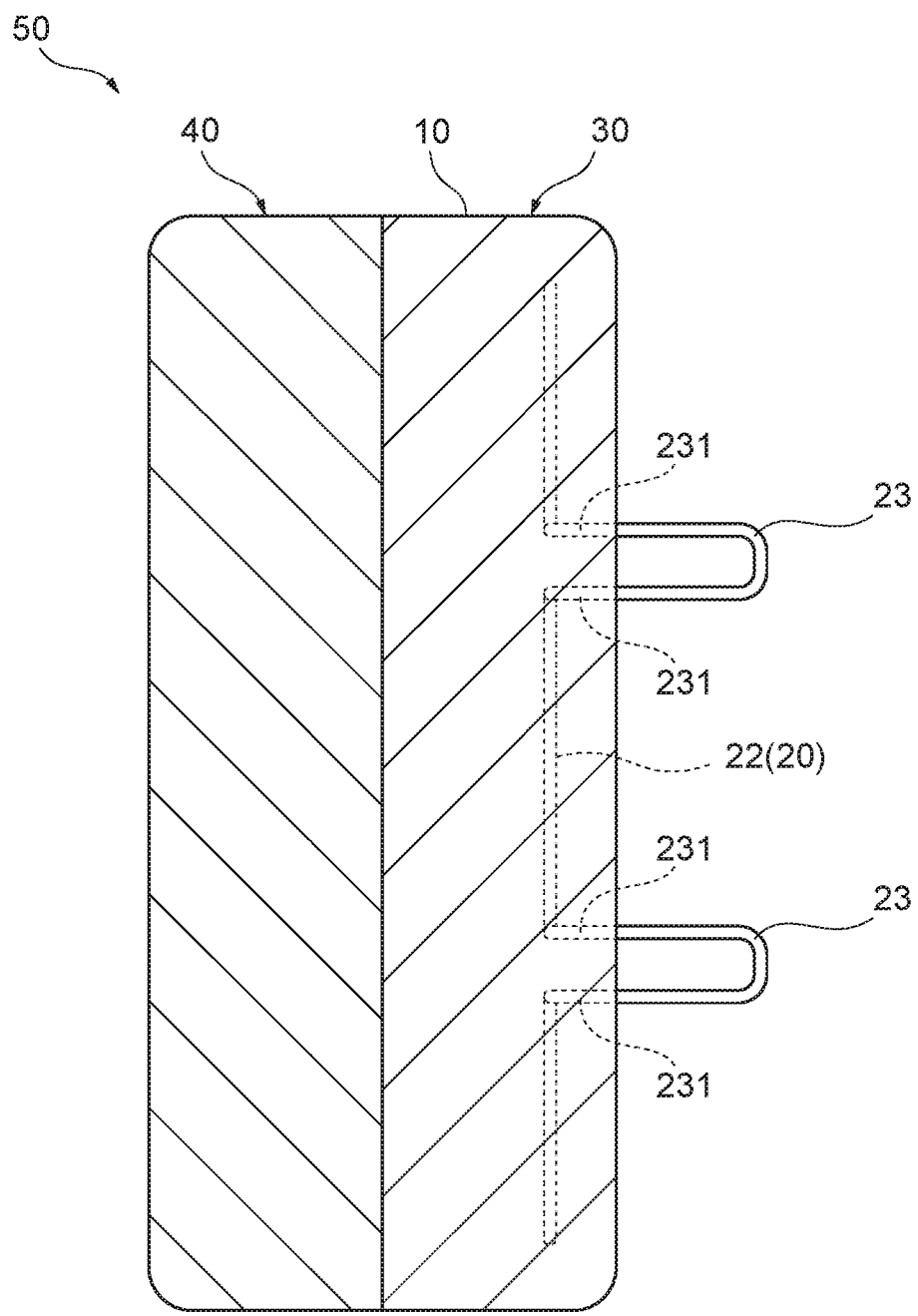
FIG. 3 is a sectional view along line III-III depicted in FIG. 2.
Figure 4:
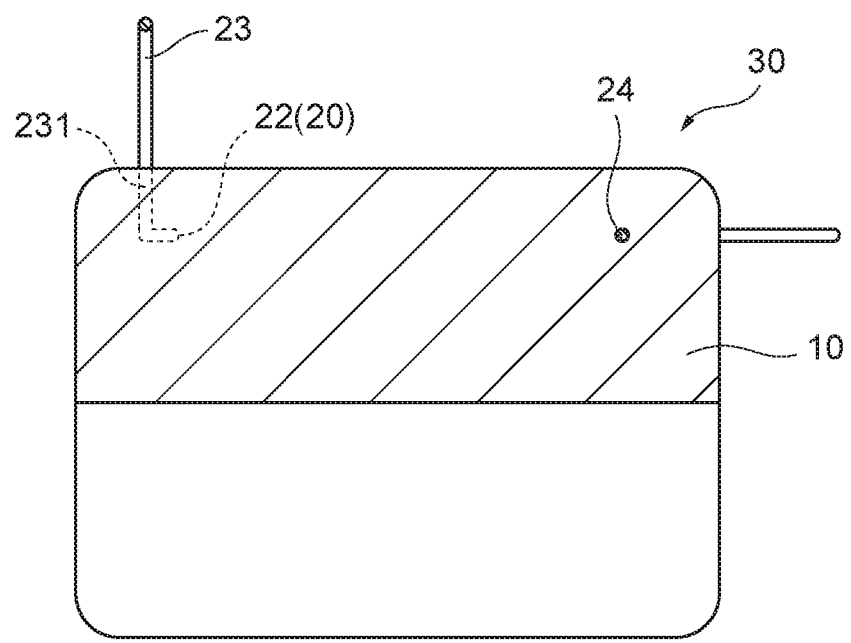
FIG. 4 is a sectional view along IV-IV line depicted in FIG. 2.

An embodiment of a vehicle seat member and a vehicle seat according to the present invention will be described below by referring to the drawings.

First, a structure of the embodiment of the vehicle seat member and the vehicle seat will be described on the basis of FIGS. 1 to 4 and each aspect of the present invention will be described individually.

<Structures of Vehicle Seat Member and Vehicle Seat>

As illustrated in FIG. 1, a vehicle seat 50 has a vehicle seat member 30 comprising a foamed resin molded body 10 and a frame member 20 embedded by integral molding in the foamed resin molded body 10 as a basic constitution. An entire shape of the vehicle seat member 30 is not particularly limited, but a substantially rectangular shape on a plan view is generally adopted, and the vehicle seat member 30 generally has the entire shape having a width in a direction substantially along a plane. A shape on a plan view and a thickness of the foamed resin molded body 10 may be varied depending on a shape of a vehicle body to which the vehicle seat 50 is mounted.

The foamed resin molded body 10 is an in-mold foamed molded body of a foamable resin. Suitable resin types, an expansion ratio, a fusion rate, and the like will be described later in detail.

The frame member 20 is embedded in order to impart required shape-retaining property and strength to the foamed resin molded body 10, and a wire made of steel having a diameter of 3 to 6 mm may be used in general. It may be a steel part having a thin plate shape. The frame member 20 comprises, as illustrated in the drawing, a body portion 21 embedded in a position slightly inward from the outer peripheral surface of the foamed resin molded body 10 along the outer periphery thereof, and two first protrusions 23, 23 each formed on a portion 22 of the body portion 21. The portion 22 of the body portion 21 lies along a side surface in the longer-side direction of the foamed resin molded body 10. However, the first protrusions 23 and 23 do not necessarily have to be formed on the portion 22. Moreover, though it is not indispensable, a second protrusion 25 is also formed on a portion 24 of the body portion 21 that lies along another side surface of the foamed resin molded body 10 in the longer-side direction in the example illustrated in the drawing.

The first protrusion 23 projects toward a thickness direction of the foamed resin molded body 10, and its tip end protrudes outward from a rear surface side of the foamed resin molded body 10. Moreover, the second protrusion projects toward a planar direction of the foamed resin molded body 10 and its tip end protrudes outward from a side surface side of the foamed resin molded body 10. In the illustrated example, the first and second protrusions 23 and 25 are formed by bending a steel wire constituting the body portion 21 into a substantially U-shape, but may also be formed by integrating an approximately U-shaped protrusion, which has been prepared separately, with the body portion 21 through welding or the like. Alternatively, though not illustrated, a metal or resin plate may be arranged at a corner and the plate may be integrally connected with a steel wire. Moreover, the first protrusions 23 and 23 may be stood upright on such a plate.

Positions where the first protrusions 23 and 23 are formed are determined in accordance with positions of mounting jigs on the vehicle body to which the vehicle seat 50 is mounted. Typically, each the positions may be a position close to one of the opposite ends of the portion 22 of the body portion 21 along a side surface of the foamed resin molded body 10 in the longer-side direction.

The illustrated vehicle seat 50 further has an upper seat member 40 on an upper part of the vehicle seat member 30 described above. Here, the upper part of the vehicle seat member 30 refers to a position in the vehicle seat member 30 which becomes a side on which an occupant of the vehicle is seated when the vehicle seat member 30 is installed in the vehicle. This upper seat member 40 is made of a cushion material elastically deforming upon application of a load, and the vehicle seat member 30 is formed of a foamed resin molded body having compression strength higher than that of the upper seat member 40. An example of the cushion material constituting the upper seat member 40 is a soft polyurethane-based foam. In this case, as described above, the foamed resin molded body constituting the vehicle seat member 30 is preferably a molded body by a foamed polystyrene-based resin, a molded body of a foamed composite resin of a polystyrene-based resin and a polyolefin-based resin, a molded body of a foamed polyolefin-based resin, or a molded body of a foamed composite resin containing a polystyrene-based resin and a polyphenylene ether resin. In the vehicle seat 50 in this aspect, a comfortable sense of elasticity can be given to the seated person by the upper seat member 40, and deformation of the vehicle seat 50 more than necessary can be prevented by the vehicle seat member 30. Moreover, though not illustrated, in actual use, the vehicle seat 50 is covered by an appropriate cover material.

Hereinafter, each aspect of the present invention will be described more specifically.

<First Aspect>

A first aspect of the present invention is a method for producing the vehicle seat member 30, comprising:

an in-mold foam molding step of placing the frame member 20 in a mold lot so that the body portion 21 is located inside the mold 100, packing prefoamed resin particles obtained by prefoaming foamable resin particles comprising a resin and a foaming agent and then, foaming the prefoamed resin particles in the mold 100 to mold the foamed resin molded body 10: and a demolding step of removing the mold 100 to obtain the vehicle seat member 30, wherein in the in-mold foam molding step, (B−A)/B is 13/1000 or less, more preferably 2.5/1000 or more and 13/1000 or less, more preferably 3/1000 or more, more preferably 11/1000 or less, more preferably 10/1000 or less, and more preferably 9/1000 or less, wherein A is an outer dimension of the foamed resin molded body 10 in the vehicle seat member 30 obtained by the demolding step and B is an inner dimension of the mold 100 corresponding to the outer dimension.

The aforementioned (B−A)/B is an index indicating how much the foamed resin molded body 10 molded in the mold 100 in the in-mold foam molding step shrinks after the demolding step.

If (B−A)/B is 13/1000 or less, the amount of shrinkage of the foamed resin molded body 10 is sufficiently small, and the amount of a change in the position of the frame member 20 and the amount of a change in the position of the protrusions 23 and 25 in the final vehicle seat member 30 are small, which is preferable. If (B−A)/B is 2.5/1000 or more, base end portions 231 and 251 of the protrusions 23 and 25 and the body portion 21 in the frame member 20 are held by the foamed resin molded body 10 surrounding them with sufficient strength by the shrinkage of the foamed resin molded body 10 in the production step, which is preferable.

Figure 6:
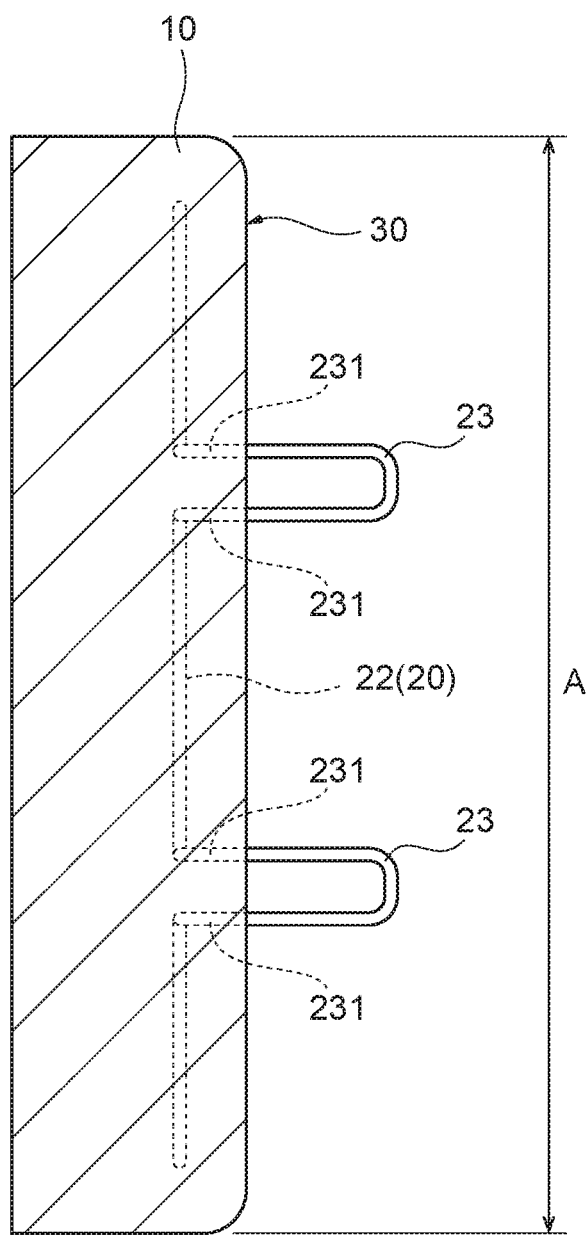
FIG. 6 is a schematic diagram illustrating the vehicle seat member 30 after a demolding step in the production method for the vehicle seat member 30 according to the present invention.

The outer dimension of the foamed resin molded body 10 may be an outer dimension measured after sufficient time has elapsed since the demolding step, for example, after being left for 24 hours or more from the demolding step under an atmospheric air in which a temperature and an air pressure are not particularly adjusted (that is, under the conditions of a room temperature and an atmospheric pressure). A portion for measuring the outer dimension of the foamed resin molded body 10 is not particularly limited, and it may be a width of any portion of the foamed resin molded body 10. When the foamed resin molded body 10 has an entire shape having a width in a direction substantially along the plane, it may be a width on a plan view or may be a width in a thickness direction. If the foamed resin molded body 10 is substantially rectangular on a plan view, as illustrated in FIG. 6, a length A on the plan view can be regarded as the outer dimension of the foamed resin molded body 10.

Figure 5:
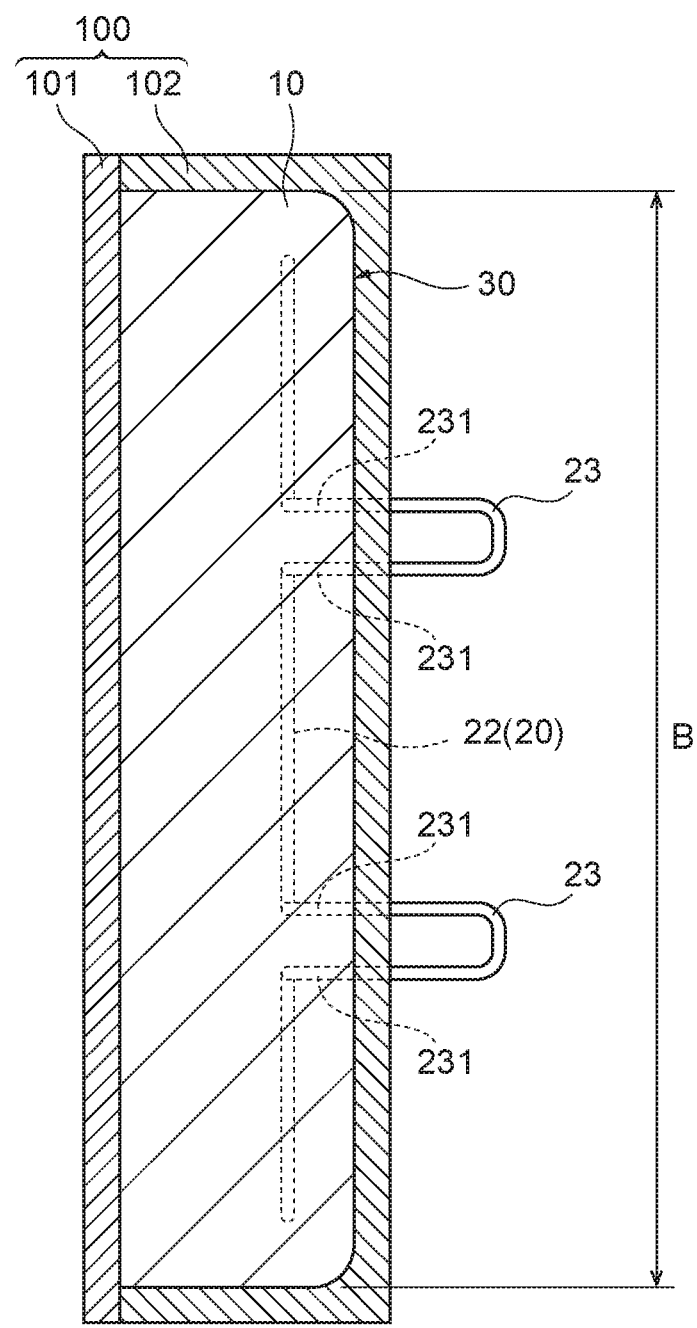
FIG. 5 is a schematic diagram for explaining an in-mold foam molding step in a production method for a vehicle seat member 30 according to the present invention.

The inner dimension of the mold 100 corresponding to the outer dimension of the foamed resin molded body 10 is determined in accordance with the outer dimension of the foamed resin molded body 10. If the foamed resin molded body 10 has a substantially rectangular shape on the plan view, for example, assuming that the length A on the plan view is the outer dimension of the foamed resin molded body 10 as illustrated in FIG. 6, a corresponding length B of the mold 100 is the inner dimension of the mold 100 as illustrated in FIG. 5.

In the in-mold foam molding step, the frame member 20 is placed in the mold 100 so that the body portion 21 is located inside (in the cavity of) the mold 100. In this step, it is preferable that the tip ends of the protrusions 23 and 25 in the frame member 20 are not located in the cavity of the mold 100 filled with the foamed resin in the in-mold foam molding. As illustrated in FIG. 5, for example, the frame member 20 is placed so that the tip ends of the protrusions 23 and 25 in the frame member 20 are located outside the mold 100 (a portion other than the cavity). Moreover, unlike the illustrated example, the frame member 20 may be placed in the cavity of the mold 100 in a state where a barrier is provided around the tip ends of the protrusions 23 and 25 in the frame member 20 so that the foamed resin does not enter. By placing as above, the body portion 21 and the base end portions 231 and 251 of the protrusions 23 and 25 in the frame member 20 are embedded in the foamed resin molded body 10 by the in-mold foam molding step and the demolding step which will be described later, and the vehicle seat member 30 having a structure in which the tip ends of the protrusions 23 and 25 are exposed to the outside of the foamed resin molded body 10 is obtained.

In the in-mold foam molding step, in order to carry out the in-mold foam molding so that (B−A)/B is within the aforementioned predetermined range, the in-mold foam molding may be carried out by adjusting the resin type, the expansion ratio, the fusion rate, and the like as appropriate.

The resin, a foaming agent, foamable resin particles, prefoamed resin particles, the in-mold foam molding step, and the demolding step in the first aspect of the present invention will be described below.

(Resin)

The resin is not particularly limited, and a composite resin containing a polystyrene-based resin and a polyolefin-based resin, a polystyrene-based resin, a composite resin containing a polystyrene-based resin and a polyphenylene ether resin, a polyolefin-based resin, a polyester-based resin, and the like can be used. When the composite resin containing the polystyrene-based resin and the polyolefin-based resin, the polystyrene-based resin, or the composite resin containing the polystyrene-based resin and the polyphenylene ether resin is used, carrying out the in-mold foam molding under the conditions with the general expansion ratio and fusion rate as described later is particularly preferable for achieving (B−A)/B within the aforementioned predetermined range.

The foamable resin particles are obtained by impregnating the resin particles with the foaming agent, and they may be impregnated with the foaming agent at the same time as formation by polymerization of the resin or may be allowed to be impregnated with the foaming agent after polymerization of the resin.

The resin particles which can be suitably used for the present invention and the foamable resin particles obtained by impregnating the resin particles with the foaming agent will be described below in detail.

(Composite Resin Particles Containing Polystyrene-Based Resin and Polyolefin-Based Resin)

The composite resin particles contain the polyolefin-based resin and the polystyrene-based resin.

A shape of the composite resin particle is preferably spherical, oval spherical (egg-shaped), or columnar, for example.

Moreover, an average particle size is not particularly limited but it is preferably 0.3 to 7 mm. If the average particle size is less than 0.3 mm, capability of the foamable resin particles to hold the foaming agent lowers, and reduction in density can become difficult. If it exceeds 7 mm, packing properties of the prefoamed resin particles in the mold lower, and thinning of the foamed molded body can become difficult.

Furthermore, a ratio between a maximum diameter L and a minimum diameter D (L/D) of the composite resin particle is not particularly limited but it is preferably 1 to 1.6. In a particle with a large flatness exceeding 1.6, the packing properties of the prefoamed resin particles in the mold can lower.

(1) Polyolefin-Based Resin

Examples of the polyolefin-based resin include resins containing units derived from an olefin monomer having 2 to 10 carbon atoms such as polypropylene and polyethylene. The polyolefin-based resin may be a homopolymer of an olefin monomer or may be a copolymer of an olefin monomer and another monomer capable of copolymerization with the olefin monomer. Moreover, the polyolefin-based resin may be crosslinked. Examples of the copolymer include a copolymer of vinyl acetate and ethylene (EVA). As the polyolefin-based resin, a resin having a weight average molecular weight of 180000 to 500000 can be used, for example.

When EVA is used as the polyolefin-based resin, a content of the unit derived from vinyl acetate in EVA is preferably 5.5 to 8 mass %. If the content is less than 5.5 mass %, foaming moldability might lower. If the content is larger than 8 mass %, since a melting point of EVA becomes less than 100° C., foam molding might become difficult. Moreover, EVA is preferably contained in the polyolefin-based resin in an amount of 80 mass % or more.

(2) Polystyrene-Based Resin

Examples of the polystyrene-based resin include resins derived from a styrene monomer such as styrene and substituted styrene (examples of the substituent include lower alkyl and a halogen atom (particularly, chlorine atom)). Examples of the substituted styrene include α-methylstyrene, p-methylstyrene, t-butylstyrene, and chlorostyrene. Moreover, the polystyrene-based resins may be a homopolymer of a styrene monomer or may be a copolymer of a styrene monomer and another monomer capable of copolymerization with the styrene monomer. Examples of another monomer include acrylonitrile, (meth)acrylic acid alkyl ester (alkyl part having approximately 1 to 8 carbon atoms), divinylbenzene, mono or di(meth)acrylic acid ester of ethylene glycol, maleic anhydride, and N-phenylmaleimide.

If another monomer is used, it is preferably used within a range not larger than 30 mass parts to 100 mass parts of the styrene monomer.

The polystyrene-based resin is more preferably a resin derived only from styrene.

(3) Contents of Polyolefin-Based Resin and Polystyrene-Based Resin

The content of the polystyrene-based resin can be 120 to 400 mass parts to 100 mass parts of the polyolefin-based resin. If the content of the polystyrene-based resin is less than 120 mass parts, foaming properties of the foamable resin particles and chemical resistance and heat resistance of the foamed molded body might lower. On the other hand, if the content of the polystyrene-based resin is larger than 400 mass parts, rigidity of the foamed molded body might lower. A more preferable content of the polystyrene-based resin is 150 to 250 mass parts to 100 mass parts of the polyolefin-based resin.

(4) Other Additives

The composite resin particles may contain other additives. Examples of the other additives include a nucleating agent, a coloring agent, a flame retardant, a flame retardant promoter, an oxidation inhibitor, an ultraviolet absorber, and a flake silicate.

Examples of the nucleating agent include zinc stearate, aluminum stearate, and amide ethylenebisstearate.

Examples of the coloring agent include carbon black, iron oxide, and graphite.

Examples of the flame retardant include bromine-based flame retardants such as tris(2,3-dibromopropyl)isocyanurate, tetrabromocyclooctane, hexabromocyclododecane, decabromodiphenylether, tribromophenylarylether, tetrabromobisphenol-A-diarylether, tetrabromobisphenol-A-diglycidyletner, tetrabromobisphenol-A-di(hydroxyethyl)ether, and tetrabromobisphenol-A-bis(2,3-dibromopropyl)ether, chlorine-based flame retardants such as chlorinated paraffin, triphenyl chloride, diphenyl chloride, perchloropentacyclodecane, and chlorodicyclopentadiene, chlorine/bromine-containing flame retardants such as 1,2-dibromo-3-chloropropane and 2-chloro-1,2,3,4-tetrabromobutane, phosphorus-based flame retardants such as tris(2,3-dibromopropyl)phosphate and tris(bromochloropropyl)phosphate, and inorganic flame retardants such as aluminum hydroxide and magnesium hydroxide.

An amount of the flame retardant to be used is preferably 1 to 10 mass parts to 100 mass parts of the composite resin particles. If the amount to be used is less than 1 mass part, flame-retardant property of the composite resin particles cannot be generated easily. If the amount to be used is larger than 10 mass parts, not only an effect according to the use in a large quantity cannot be obtained, but the foamed molded body can be fragile in some cases. A more preferable amount to be used is 2 to 8 mass parts.

Examples of the flake silicate include mica (natural mica, synthetic mica, for example) and sericite.

(5) Production Method for Composite Resin Particles

The composite resin particles can be produced by any method as long as the polyolefin-based resin and the polystyrene-based resin can be contained in the particles. Examples of such methods include a method in which the both resins are kneaded in an extruding machine, and the kneaded article is cut, and a method in which a seed particle containing the polyolefin-based resin is impregnated with a styrene monomer in an aqueous medium and then, the monomer is polymerized. The latter method of them is preferable from a viewpoint that the both resins can be mixed more uniformly and a particle much closer to a spherical shape can be obtained. Here, the composite resin particles obtained by the latter method shall be referred to as a polyolefin modified polystyrene-based resin particle or simply as a modified resin particle. The latter method includes the following steps, for example:

(i) a monomer impregnating step of impregnating 100 mass parts of seed particles containing the polyolefin-based resin with 120 to 400 mass parts of the styrene monomer in a dispersion prepared by dispersing the seed particles in an aqueous medium; and (ii) a polymerizing step of causing the styrene monomer polymerized at the same time as the impregnation or after the impregnation.

(a) Monomer Impregnating Step (a-1) The seed particle can be obtained by a well-known method. For example, first, the polyolefin-based resin is melted and extruded by using the extruding machine and then, by granulating through underwater cutting, strand cutting, hot cutting, and the like, the seed particles can be made. Usually, a shape of the seed particle to be used can be spherical, oval spherical (egg-shaped), columnar, prism, pellet, or granular, for example.

The mass of an individual seed particle is not particularly limited. However, considering that the mass of the modified resin particle is regulated by this mass, the mass can be approximately 10 to 500 mg/100 particles in general.

Moreover, an average size of the individual seed particle is not particularly limited, either. However, considering that the average size of the modified resin particle is regulated by this average size, the average size can be 0.2 to 1.5 mm. If the average size is less than 0.2 mm, capability of the foamable resin particles to hold a foaming agent lowers, and reduction in density can become difficult. If it exceeds 1.5 mm, packing properties of the prefoamed resin particles in the mold lower, and thinning of the foamed molded body can become difficult in some cases.

Furthermore, the ratio between the maximum diameter L and the minimum diameter D (L/D) of the individual seed particles is not particularly limited. However, considering that L/D of the modified resin particle is regulated by this L/D, L/D can be 1 to 1.6. In a particle with a large flatness exceeding 1.6, the packing properties of the foamed resin particles in the mold can lower in some cases.

The seed particle may contain other additives listed in the aforementioned item (4).

(a-2) Examples of the aqueous medium include water and a mixed medium of water and an aqueous solvent (alcohol, for example). The aqueous medium may contain a dispersing agent for stabilizing dispersibility of droplets of the styrene monomer and seed particles.

Examples of the dispersing agent include water-soluble polymers such as polyvinyl alcohol, methylcellulose, polyacrylamide, and polyvinyl pyrrolidone, and slightly soluble inorganic compounds such as tribasic calcium phosphate, magnesium pyrophosphate, and calcium carbonate. Here, when the slightly soluble inorganic compound is to be used, a surfactant is preferably used at the same time. An amount of the dispersing agent to be used is preferably 0.1 to 4 mass % in the aqueous medium containing the dispersing agent. In the case of less than 0.1 mass %, an effect of dispersion stability cannot be exerted easily in some cases. In the case of larger than 4 mass %, though the effect of dispersion stability is exerted, an effect of use in a large quantity is not expected, and a production cost might increase.

Examples of the surfactant include fatty acid soaps, N-acylamino acid or its salt, carboxylates such as alkyl ether carboxylate, alkylbenzenesulfonates such as calcium dodecylbenzenesulfonate and sodium dodecylbenzenesulfonate, sulfonates such as alkylnaphthalenesulfonates, dialkylsulfosuccinates, alkylsulfoacetates, and α-olefinsulfonates, sulfuric ester salts such as higher alcohol sulfuric ester salts, secondary higher alcohol sulfuric ester salts, alkyl ether sulfates, and polyoxyethylene alkylphenylether sulfates, and phosphates such as alkyl ether phosphates and alkyl phosphates.

(a-3) The impregnation of the seed particle with the styrene monomer is carried out at a temperature not substantially generating polymerization of the styrene monomer in general. Alternatively, the polymerization of the styrene monomer may be carried out while the seed particle is impregnated with the styrene monomer. The impregnation temperature is usually in the range of 50 to 100° C.

(b) Polymerization Step

The polymerization step is carried out at the same time as the impregnation or after the impregnation.

(b-1) The polymerization of the styrene monomer can be carried out with the presence of a polymerization initiator.

As the polymerization initiator, polymerization initiators used in the normal polymerization of styrene can be used. Examples include initiators generating tertiary alkoxy radical such as t-butyl peroxy-2-ethylhexanoate, t-amyl peroxy-2-ethylhexanoate, t-butyl peroxy isobutyrate, 1,1,3,3-tetramethylbutyl peroxy-2-ethylhexanoate, di-t-butyl peroxy hexahydroterephthalate, 2,2-bis(t-butyl peroxy)butane, t-butyl peroxy benzoate, 2,2-di-t-butyl peroxy butane, dicumyl peroxide, 2,5-dimethyl-2,5-di-t-butyl peroxy hexane, t-butyl peroxide, t-butyl peroxy pivalate, t-butyl peroxy isopropyl carbonate, t-butyl peroxy acetate, and t-butyl peroxy-3,3,5-trimethyl hexanoate, initiators such as benzoyl peroxide and lauryl peroxide, and azo compounds such as azobisisobutyronitrile and azobisdimethylvaleronitrile. These polymerization initiators may be used singly or in combinations of two or more. In order to adjust the molecular weight and to reduce a remaining monomer, it is preferable that a plurality of polymerization initiators with a decomposition temperature for obtaining a half-life of 10 hours in the range of 80 to 120° C. are used at the same time.

(b-2) The styrene monomer may include a plasticizer, a chain transfer agent, an oil-soluble polymerization inhibitor, a water-soluble polymerization inhibitor, a cell adjusting agent, a flame retardant, a flame retardant promoter, and the like.

Examples of the plasticizer include toluene, xylene, cyclohexane, ethyl acetate, dioctyl phthalate, and tetrachloroethylene.

Examples of the chain transfer agent include mercaptan and α-methylstyrene.

(b-3) The polymerization temperature is preferably in the range of 70 to 140° C., and more preferably in the range of 90 to 130° C. The temperature may rise to the polymerization temperature in a constant rate or in steps. A temperature rise rate is preferably 0.1 to 2° C./minute.

(b-4) The polyolefin-based resin may be crosslinked as necessary. Examples of a crosslinking agent include organic peroxides such as 2,2-di-t-butyl peroxy butane, 2,2-bis(t-butyl peroxy)butane, dicumylperoxide, and 2,5-dimethyl-2, 5-di-t-butyl peroxy hexane. These crosslinking agents can be used singly or two or more thereof can be mixed and used. An amount of the crosslinking agent to be used is preferably 0.05 to 1 mass part to 100 mass parts of the polyolefin-based resin.

Crosslinking timing can be before the polymerization or after the polymerization of the styrene monomer. The crosslinking agent may be added to a polymerization system singly. From the viewpoint of safety, the crosslinking agent is preferably added in a form of a solution solved in a solvent, a plasticizer, or the styrene monomer, or in a form of a dispersion dispersed in water.

Moreover, a cell adjusting agent, a flame retardant, a flame retardant promoter, and the like may be added to a reaction system at crosslinking as necessary.

(6) Commercial Composite Resin Particle

As the composite resin particle containing the polystyrene-based resin and the polyolefin-based resin, a commercial product may be available. Examples of the commercial composite resin particle containing the polystyrene-based resin and the polyolefin-based resin include Piocelan (registered trademark): OP-30EU and OP-30ELV manufactured by Sekisui Plastics Co., Ltd.

(Polystyrene-Based Resin Particle)

(1) Polystyrene-Based Resin

Examples of the polystyrene-based resin constituting the polystyrene-based resin particle are not particularly limited and include a homopolymer of a styrene monomer such as styrene, α-methylstyrene, vinyl toluene, chlorostyrene, ethylstyrene, i-propylstyrene, dimethylstyrene, and bromostyrene, or a copolymer of two or more of these monomers, and the polystyrene-based resin containing 50 mass % or more of a styrene component is preferable and polystyrene is more preferable.

Moreover, the polystyrene-based resin may have the styrene monomer as a main component and may be a copolymer with a vinyl monomer capable of copolymerization with this styrene monomer. Examples of such a vinyl monomer include alkyl (meth)acrylate such as methyl (meth)acrylate, ethyl (meth)acrylate, butyl (meth)acrylate, and cetyl (meth)acrylate, (meth)acrylonitrile, dimethylmaleate, dimethylfumarate, diethylfumarate, ethylfumarate, and a bifunctional monomer such as divinylbenzene and alkylene glycol dimethacrylate.

Furthermore, the polystyrene-based resin may be a virgin material, a recycled product of a used foamed molded body, or a plastic material having constituted home electric appliances and their mixture.

Moreover, the polystyrene-based resin may contain other additives as listed under item (4) in the aforementioned section titled "Composite resin particles containing polystyrene-based resin and polyolefin-based resin".

A shape of the polystyrene-based resin particle used for the present invention is not particularly limited, but a spherical shape is preferable and a particle size is preferably 0.3 to 2.0 mm, and more preferably 0.3 to 1.4 mm from the viewpoint of ease of packing of the polystyrene-based resin prefoamed particles into the mold which will be described later. If the shape is columnar, the columnar particle preferably has a volume corresponding to that of the spherical particle having the above mentioned preferable diameter. Furthermore, if a weight average molecular weight (Mw) in terms of polystyrene of the polystyrene-based resin is small, mechanical strength of the polystyrene-based resin foamed molded body obtained by foaming the foamable polystyrene-based resin particles can lower, while if it is large, foaming properties of the foamable polystyrene-based resin particles lower, and there is a concern that a polystyrene-based resin foamed molded body with a high expansion ratio cannot be obtained and thus, a range of 120000 to 600000 is preferable.

Production Method for Polystyrene-Based Resin Particle

Examples of a method for producing the polystyrene-based resin particles, from which foamable polystyrene-based resin particles are prepared, include usual methods, such as a method comprising supplying a virgin material or a recycled product to an extruding machine and melting and kneading it, extruding it in a strand shape from the extruding machine and cooling it and then, cutting it into each predetermined length to produce the polystyrene-based resin particles (strand cut method), and a method comprising supplying a virgin material or a recycled product to an extruding machine and melting and kneading it, extruding it into underwater through a hole of an orifice attached to a distal end of the extruding machine and cutting and cooling it at the same time to produce the polystyrene-based resin particles (underwater hot cut method). Moreover, after flake silicate or a metal oxide is dispersed in the resin in this extruding machine, it may be cut to each predetermined length to obtain the polystyrene-based resin particles.

Moreover, the following method may be employed: the polystyrene-based resin particles are produced by a seed polymerization method comprising suspending polystyrene-based resin seed particles in water, impregnating the particles in the suspension with a styrene monomer, and then polymerizing the monomer in the seed particle. A foaming agent is added to the polystyrene-based resin particles produced in this seed polymerization method.

The amount of the styrene monomer to be absorbed in the polystyrene-based resin seed particles for the seed polymerization is in the range of 10 to 800 mass parts of the styrene monomer per 100 mass parts of the seed particles. Moreover, the range is preferably 50 to 500 mass parts. If the amount to be absorbed is less than 10 mass parts, the amounts of the styrene monomer and the polymerization initiator are too small to be absorbed to center parts of the seed particles, and uniform seed polymerization in the seed particles cannot be realized. If the amount to be absorbed exceeds 800 mass parts, in addition to deterioration of productivity due to too much time required for the seed polymerization, polymerization powders derived from the styrene monomer not absorbed in the seed particles are generated in a large quantity, which is not preferable.

Examples of the polymerization initiator used when the polystyrene-based resin seed particle is impregnated with the styrene monomer for the seed polymerization are not particularly limited, and the polymerization initiators listed in (b-1) under (5) of the aforementioned section titled "Composite resin particles containing polystyrene-based resin and polyolefin-based resin" can be used.

In the seed polymerization and when the foaming agent is to be contained, a dispersing agent may be used for stabilizing dispersibility of droplets of the styrene monomer, the polystyrene-based resin seed particles, and the polystyrene-based resin particles, and examples of such dispersing agents include the dispersing agents listed in (a-2) under (5) of the aforementioned section titled "Composite resin particles containing polystyrene-based resin and polyolefin-based resin".

(3) Commercial Polystyrene-Based Resin Particle

As the polystyrene-based resin particle, a commercial product can be available. Examples of the commercial polystyrene-based resin particle include Eslen beads: FDK-40LV and ESDK, manufactured by Sekisui Plastics Co., Ltd.

(Other Resin Particles)

The other resin particles also may have a similar shape to that of the composite resin particles containing the polystyrene-based resin and the polyolefin-based resin or that of the polystyrene-based resin particle detailed above. The other resin particles also may contain other additives similar to that detailed above, as appropriate.

Examples of the other resin particles include a composite resin particle containing polystyrene-based resin and polyphenylene ether resin, a polyolefin-based resin particle, and a polyester-based resin particle.

Examples of the polystyrene-based resin in the composite resin particle containing the polystyrene-based resin and the polyphenylene ether resin include the polystyrene-based resins listed in (2) of the aforementioned section titled "Composite resin particles containing polystyrene-based resin and polyolefin-based resin".

The polyphenylene ether resin in the aforementioned composite resin may be a polyphenylene ether resin expressed by the following formula:

[Formula 1]

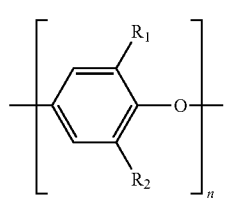

wherein $R_1$ and $R_2$ indicate an alkyl group having 1 to 4 carbon atoms or a halogen atom, and n indicates a degree of polymerization. Specific examples of the polyphenylene ether resin include poly(2,6-dimethylphenylene-1,4-ether), poly(2,6-diethylphenylene-1,4-ether), poly(2,6-dichlorophenylene-1,4-ether), poly(2-methyl-6-ethylphenylene-1,4-ether), poly(2-chloro-6-methylphenylene-1,4-ether), poly(2-methyl-6-isopropylphenylene-1,4-ether), poly(2,6-di-n-propylphenylene-1,4-ether), poly(2-bromo-6-methylphenylene-1,4-ether), poly(2-chloro-6-bromophenylene-1,4-ether), and poly(2-chloro-6-ethylphenylene-1,4-ether). The degree of polymerization (n in the aforementioned formula) may be 10 to 5000. If it is 5000 or less, a uniform foamed body can be obtained easily, while if it is 10 or more, a foamed body having a targeted heat resistance can be obtained easily.

A ratio between the polystyrene-based resin and the polyphenylene ether resin in the aforementioned composite resin is not particularly limited, but assuming that the total of the polystyrene-based resin and the polyphenylene ether resin is 100 mass parts, 90 to 10 mass parts of the polystyrene-based resin and 10 to 90 mass parts of the polyphenylene ether resin are preferably contained, and 90 to 30 mass parts of the polystyrene-based resin and 10 to 70 mass parts of the polyphenylene other resin are more preferably contained. When 90 mass parts or less of the polystyrene-based resin and 10 mass parts or more of the polyphenylene ether resin are contained, sufficient heat resistance can easily be given to the foamed molded body of the composite resin.

Examples of the polyolefin-based resin constituting the polyolefin-based resin particles include the polyolefin-based resins mentioned in (1) of the aforementioned section titled "Composite resin particles containing polystyrene-based resin and polyolefin-based resin". Examples of the polyester-based resin constituting the polyester-based resin particles include polyethylene terephthalate.

As a method for producing the particles containing these other resins, a usual method is used as is for the composite resin particles containing the polystyrene-based resin and the polyolefin-based resin or the polystyrene-based resin particles described above in detail. For example, the resin particles can be produced by a method comprising supplying a virgin material of a resin or a recycled product to an extruding machine and melting and kneading it, extruding it in a strand shape from the extruding machine and cooling it and then, cutting it into each predetermined length to produce the resin particles (strand cut method), or a method comprising supplying a virgin material or a recycled product to an extruding machine and melting and kneading it, extruding the resin into underwater through a hole of an orifice attached to a distal end of the extruding machine and cutting and cooling it at the same time to produce the resin particles (underwater hot cut method). Moreover, after flake silicate or a metal oxide is dispersed in the resin in this extruding machine, it may be cut to each predetermined length to obtain the resin particles. Moreover, the following method may be employed: the resin particles are produced by the seed polymerization method comprising suspending resin seed particles in water, impregnating the particles in the suspension with a monomer, and then polymerizing the monomer in the seed particle. A foaming agent is added to the resin particles produced in this seed polymerization method.

Particularly, the particles of the composite resin containing the polystyrene-based resin and the polyphenylene ether resin may be produced by any method as long as the polystyrene-based resin and the polyphenylene ether resin can be contained in the particle. Examples of such methods include a method in which the both resins are kneaded in an extruding machine, and the kneaded article is cut, and a method in which the seed particle containing one of the resins is impregnated with a monomer forming the other resin in an aqueous medium and then, the monomer is polymerized in the seed particle. The latter method is preferable from a viewpoint that the both resins can be mixed more uniformly and a particle much closer to a spherical shape can be obtained. Here, the composite resin particles obtained by the latter method shall be referred to also as a polystyrene-based resin-modified polyphenylene ether resin particle. The step of impregnation of the seed particle with the monomer and the polymerization step can be carried out by a procedure similar to the procedure described in (5) of the aforementioned section titled "Composite resin particles containing polystyrene-based resin and polyolefin-based resin".

Commercial products can be purchased for use also for the particles containing the other resins as described above.

(Foamable Resin Particle)

The foaming agent contained in the foamable resin particles is not particularly limited and any of known agents can be used. Particularly, organic compounds having a boiling point not higher than a softening point of a resin to be used and in a gas state or in a liquid state at a normal pressure are suitable. Examples include hydrocarbons such as propane, n-butane, isobutane, n-pentane, isopentane, neopentane, cyclopentane, cyclopentadiene, n-hexane, and petroleum ether, ketones such as acetone and methyl ethyl ketone, alcohols such as methanol, ethanol, and isopropyl alcohol, ether compounds having a low boiling point such as dimethyl ether, diethyl ether, dipropyl ether, and methyl ethyl ether, halogen-containing hydrocarbons such as trichloromonofluoromethane and dichlorodifluoromethane, and inorganic gases such as carbonic acid gas, nitrogen, and ammonia. These foaming agents may be used singly or in combinations of two or more. Hydrocarbons are especially preferable from the viewpoint of prevention of destruction of an ozone layer and a viewpoint that air can be substituted quickly and time-course change of the foamed molded body is suppressed. Hydrocarbons having a boiling point of −45 to 40° C. are more preferable, and propane, n-butane, isobutane, n-pentane, isopentane, and the like are further preferable.

When a content of the foaming agent in the foamable resin particle is small, an increase in the expansion ratio of the foamed molded body can become difficult and thermal fusion between the foamed resin particles become insufficient, whereby appearance of the foamed molded body is deteriorated in some cases. On the other hand, if the content of the foaming agent is large, long time is required for adjustment of the amount of the foaming gas remained in the foamed resin particles or for foam molding, which might lower production efficiency, and the finally obtained foamed molded body easily shrinks, and (B−A)/B tends to become larger than the aforementioned preferable range. A preferable content is 5 to 25 mass parts to 100 mass parts of the foamable resin particles. The content of the foaming agent in the foamable resin particles is measured after being left for five days in a constant temperature chamber at 13° C. immediately after the production.

(Production Method for Foamable Resin Particle)

The impregnation with the foaming agent may be carried out to the particle after polymerization of the resin or to the particle in the middle of the polymerization. The impregnation in the middle of the polymerization can be carried out by a method of impregnation in the aqueous medium (wet impregnation method). The impregnation after the polymerization can be carried out by the wet impregnation method or a method of impregnation in non-presence of a medium (dry impregnation method). The impregnation in the middle of the polymerization is preferably carried out usually in a second half of the polymerization. The second half of the polymerization is preferably after 70 mass % of a constituent monomer has been polymerized. Moreover, it is also possible to carry out the impregnation with the foaming agent subsequent to the polymerization after 99 mass % of the constituent monomer has been polymerized.

An impregnation temperature of the foaming agent can be 50 to 140° C.

The impregnation with the foaming agent may be carried out in presence of the foaming promoter. Examples of the foaming promoter include solvents such as toluene, xylene, ethylbenzene, and cyclohexane, plasticizers (solvent having a high boiling point) such as diisobutyl adipate, diacetyl monolaurate, and palm oil. An amount of the foaming promoter to be added is preferably 0.2 to 2.5 mass parts to 100 mass parts of the composite resin particles.

A surface preparation agent (anti-sticking agent, fusion promoter, antistatic agent, and spreading agent, for example) may be added to the system during impregnation with the foaming agent as necessary.

The anti-sticking agent plays a role of preventing sticking between the foamable resin particles during the step of heating described below for producing the foamed resin particles. Examples of the anti-sticking agent include talc, calcium carbonate, zinc stearate, aluminum hydroxide, amide ethylene-bis-stearate, tribasic calcium phosphate, and dimethylsiloxane.

The fusion promoter plays a role of promoting fusion between the foamed resin particles in the in-mold molding. Examples of the fusion promoter include stearic acid, triglyceride stearate, triglyceride hydroxystearate, and sorbitan ester stearate.

Examples of the antistatic agent include polyoxyethylene alkyl phenol ether and sorbitan ester stearate.

Examples of the spreading agent include polybutene, polyethylene glycol, and silicone oil.

Total amount of these surface preparation agents to be added are preferably 0.01 to 2 mass parts to 100 mass parts of the resin particles.

(prefoamed Resin Particle)

The foamable resin particles are expanded (prefoamed) by treatment with water vapor or the like in a foaming machine (prefoaming machine) to become prefoamed resin particles (also simply referred to as foamed resin particles). Thus obtained prefoamed resin particles have a large number of pores. A bulk expansion ratio of the prefoamed resin particles is preferably in the range of 10 to 60 times, more preferably in the range of 10 to 50 times, more preferably in the range of 20 to 50 times, and more preferably in the range of 25 to 45 times. The prefoamed resin particles are preferably reserved at 20 to 60° C. usually for approximately 24 hours for maturing after the prefoaming.

The bulk expansion ratio and bulk density of the prefoamed resin particles are measured by the following procedure.

First, W (g) of the prefoamed resin particles are sampled as a measurement sample, this measurement sample is subjected to natural fall into a measuring cylinder, a volume V (cm$^3$) of the measurement sample dropped into the measuring cylinder is measured by using an apparent density measurement instrument complying with JIS K6911, and the bulk expansion ratio and the bulk density of the foamed particles are calculated on the basis of the following equation:

Bulk expansion ratio (times=cm$^3$/g)=volume ($V$) of measurement sample/mass (W) of measurement sample Bulk density (g/cm$^3$)=mass (W) of measurement sample/volume ($V$) of measurement sample (In-Mold Foam Molding)

In the in-mold foam molding step of the present invention, the frame member 20 is placed in the mold 100 as already described, and after the prefoamed resin particles are additionally packed, the prefoamed resin particles are expanded in the mold 100 to mold the foamed resin molded body 10. This step is called in-mold foam molding. As the mold 100, a closed mold having a large number of pores is used. The expansion (foaming) of the prefoamed resin particles is carried out by heating an inside of the cavity of the mold 100 by water vapor or the like so that gaps between the prefoamed resin particles are filled and the prefoamed resin particles are fused to each other and integrated.

The expansion ratio of the foamed resin molded body 10 obtained by the in-mold foam molding step is preferably in the range of 10 to 60 times, more preferably in the range of 10 to 50 times, more preferably in the range of 20 to 50 times, and more preferably in the range of 25 to 45 times. By controlling the expansion ratio of the foamed resin molded body 10 to be within this range, the foamed resin molded body 10 having (B−A)/B of 13/1000 or less, more preferably 2.5/1000 or more and 13/1000 or less, more preferably 3/1000 or more, more preferably 11/1000 or less, more preferably 10/1000 or less, and more preferably 9/1000 or less can be produced easily. The expansion ratio of the foamed resin molded body 10 can be controlled by adjusting the amount of the prefoamed resin particles to be packed into the cavity of the mold 100, for example.

The density of the foamed resin molded body in the present invention is measured by a method described in JIS K7222: 2005 "Foamed plastic and rubber—measurement of apparent density," Specifically, the expansion ratio (also referred to as "expansion ratio" or "ratio") and the density of the foamed resin molded body can be measured by the following method.

A test piece having a volume of 50 cm$^3$ or more (100 cm$^3$ or more in the case of a semi-hard and soft materials) is cut out of the foamed resin molded body so as not to change an original cell structure of the material, its mass is measured, and calculation is made by the following equation:

Expansion ratio (times=cm$^3$/g)=test piece volume (cm$^3$)/test piece mass (g)

Density (g/cm$^3$)=test piece mass (g)/test piece volume (cm$^3$)

Test piece conditioning: The test piece was cut out from a sample of the foamed resin molded body after 72 hours or more had elapsed since the molding and then left for 16 hours or more under atmospheric conditions of a temperature of 23° C.±2° C. and a relative humidity of 50%±5% or a temperature of 27° C.±2° C. and a relative humidity of 65%±5%.

The fusion rate between the foamed particles derived from the prefoamed resin particles in the foamed resin molded body 10 obtained by the in-mold foam molding step is not particularly limited, but it is 50 to 100%, more preferably 70 to 100%, and more preferably 90 to 100%.

Here, the fusion rate is a rate of the number of foamed particles fractured in the particles to the total number of foamed particles derived from the prefoamed resin particles, appearing on a section when the foamed resin molded body 10 is bent and fractured, expressed by percentage. The measurement of the fusion rate can be made specifically by the following procedure. The foamed resin molded body is bent and fractured by the hand into two parts, and the number of particles (a) fractured in the particles and the number of particles (b) fractured on an interface between the particles are counted for the foamed particles appearing on the fractured section in a range of 100 to 150 particles. A value obtained by substituting the results, (a) and (b), in the equation $[(a)/((a)+(b))] \times 100$ is defined as the fusion rate (%). The fracturing into two parts of the foamed resin molded body can be carried out by making a cutting line with a depth of approximately 5 mm along a center of the foamed resin molded body with a cutter knife and then, dividing the foamed resin molded body by the hand into two parts along this cutting line, for example.

By controlling the fusion rate of the foamed resin molded body 10 to be within the aforementioned range, the foamed resin molded body 10 having (B−A)/B of 13/1000 or less, more preferably 2.5/1000 or more and 13/1000 or less, more preferably 3/1000 or more, more preferably 11/1000 or less, more preferably 10/1000 or less, and more preferably 9/1000 or less can be produced easily. The fusion rate can be controlled by controlling a calorific value in heating/foaming, for example.

(Remolding Step)

The demolding step is a step of removing the mold 100 to obtain the vehicle seat member 30. When the mold 100 is a combination of a first mold 101 and a second mold 102 as illustrated in FIG. 5, the vehicle seat member 30 can be taken out by separating into the first mold 101 and the second mold 102.

The second to seventh aspects of the present invention will be described below on differences from the aforementioned first aspect and features, but description on the features in common with the aforementioned first aspect and apparent matters will be omitted. The features not described in the second to seventh aspects of the present invention are as described in relation with the aforementioned first aspect.

<Second Aspect>

The second aspect of the present invention a method for producing the vehicle seat member 30, comprising:

an in-mold foam molding step of placing the frame member 20 in the mold 100 that the body portion 21 is located inside the mold 100, packing prefoamed resin particles obtained by prefoaming foamable resin particles comprising a resin and a foaming agent and then, foaming the prefoamed resin particles in the mold 100 to provide the foamed resin molded body 10; and a demolding step of removing the mold 100 to obtain the vehicle seat member 30, wherein the in-mold foam molding step is a step of molding the foamed resin molded body 10 so that an expansion ratio is 10 to 60 times and a fusion rate between the foamed particles derived from the prefoamed resin particles is 50 to 100%; and the resin is a resin such that when a standard foamed resin molded body is produced by in-mold foam molding by using a standard mold having a cavity with a predetermined shape so that the expansion ratio and the fusion rate are obtained, and removing the standard mold, (D−C)/D is 13/1000 or less, wherein C is an outer dimension of the standard foamed resin molded body and D is an inner dimension of the standard mold corresponding to the outer dimension.

The aforementioned (D−C)/D is an index indicating how much the standard foamed resin molded body shrinks after being demolded when the standard foamed resin molded body is formed by in-mold foam molding by using only the resin.

A problem of the foamed resin molded body in which the frame member is integrally molded inside is that it has complicated dimensional changes after the demolding as compared with the molded body not containing the frame member but made only of the foamed resin, and controlling the dimension of a completed product is difficult. By using the resin having (D−C)/D of 13/1000 or less, when a plurality of the vehicle seat members 30 are to be produced, a difference in the dimension of each foamed resin molded body 10 in the individual vehicle seat member 30 can be made smaller. Thus, according to the second aspect of the present invention, a production yield of the vehicle seat member 30 having the foamed resin molded body 10 with a targeted dimension can be improved. Moreover, in the method of the second aspect of the present invention, by using the aforementioned resin, the vehicle seat member 30 produced has (B−A)/B, defined for the first aspect, of 13/1000 at the maximum and thus, the amount of shrinkage of the foamed resin molded body 10 is sufficiently small, and the amount of a change in the position of the frame member 20 and the amount of a change in the position of the protrusions 23 and 25 in the final vehicle seat member 30 become smaller, which is preferable.

In the second aspect of the present invention, the resin more preferably having (D−C)/D of 2.5/1000 or more and 13/1000 or less, more preferably 3/1000 or more, more preferably 11/1000 or less, more preferably 10/1000 or less, and more preferably 9/1000 or less is used. When (D−C)/D is 2.5/1000 or more or 3/1000 or more, the base end portions 231 and 251 of the protrusions 23 and 25 and the body portion 21 in the frame member 20 are held by the foamed resin molded body 10 surrounding them with sufficient strength as a result of shrinkage of the foamed resin molded body 10 in the production step, which is preferable. On the other hand, when (D−C)/D is 11/1000 or less or 10/1000 or less, the amount of a change in the position of the frame member 20 and the amount of a change in the position of the protrusions 23 and 25 in the final vehicle seat member 30 become further smaller, which is preferable.

As the outer dimension C of the standard foamed resin molded body, an outer dimension measured after sufficient time has elapsed since the demolding step, for example, after being left for 24 hours or more from the demolding step under an atmospheric air in which a temperature and an air pressure are not particularly adjusted (that is, under the conditions of a room temperature and an atmospheric pressure) can be used. A portion for measuring the outer dimension C of the standard foamed resin molded body is not particularly limited, and it may be a width of any portion of the standard foamed resin molded body. If the standard foamed resin molded body has an entire shape having a width in a direction substantially along the plane, it may be a width on a plan view or may be a width in a thickness direction. If the standard foamed resin molded body has a substantially rectangular shape on a plan view, for example, a length in the longer-side direction on the plan view can be regarded as the outer dimension of the foamed resin molded body.

The inner dimension D of the standard mold corresponding to the outer dimension C of the standard foamed resin molded body is determined in accordance with the outer dimension C of the standard foamed resin molded body.

The second aspect of the present invention further preferably includes features similar to those in the first aspect of the present invention. That is, in the in-mold foam molding step in the second aspect of the present invention, the foamed resin molded body 10 is molded so that (B−A)/B, specified for the first aspect, is 13/1000 or less, more preferably 2.5/1000 or more and 13/1000 or less, more preferably 3/1000 or more, more preferably 11/1000 or less, more preferably 10/1000 or less, and more preferably 9/1000 or less.

The resin used in the second aspect of the present invention is not particularly limited as long as the resin is a resin such that (D−C)/D is within the aforementioned range, but a composite resin containing a polystyrene-based resin and a polyolefin-based resin, a polystyrene-based resin, a composite resin containing a polystyrene-based resin and a polyphenylene ether resin, a polyolefin-based resin, and a polyester-based resin can be used, and the composite resin containing the polystyrene-based resin and the polyolefin-based resin or the polystyrene-based resin is particularly preferable. More preferable embodiments of the resin used in the second aspect of the present invention are as described in relation with the first aspect of the present invention.

In the second aspect of the present invention, preferable ranges of the expansion ratio and the fusion rate of the foamed resin molded body 10 are as exemplified as preferable ranges in relation with the first aspect.

In the second aspect of the present invention, a value of the expansion ratio and a value of the fusion rate of the standard foamed resin molded body are, assuming that the value of the expansion ratio and the value of the fusion rate of the foamed resin molded body 10 are each 100, preferably 80 to 120, more preferably 90 to 110, particularly preferably 98 to 102, and the most preferably 100. Definition of the fusion rate is as already described in relation with the first aspect of the present invention. The foaming agent, the foamable resin particles containing the resin and the foaming agent, and the prefoamed resin particles obtained by prefoaming the foamable resin particles used for producing the standard foamed resin molded body, are preferably the same as those used for producing the foamed resin molded body 10 as already described in relation with the first aspect.

In the second aspect of the present invention, the standard mold having a cavity with the aforementioned predetermined shape is not particularly limited, but examples of it include the mold used for production of the vehicle seat member 30 or a mold having a cavity with a regular hexahedron shape (a mold having a cavity with a regular hexahedron shape with one side of 10 cm, for example). The standard foamed resin molded body molded by using the standard mold preferably does not have the frame member embedded in it but is made only of the foamed resin.

<Third Aspect>

The third aspect of the present invention is a method for producing the vehicle seat 50, comprising:

a vehicle seat member production step of producing the vehicle seat member 30 by the method according to the first aspect or second aspect of the present invention; and a vehicle seat production step of producing the vehicle seat 50 by placing the upper seat member 40 on an upper part of the vehicle seat member 30 obtained by the vehicle seat member production step.

In the vehicle seat production step, means for combining the vehicle seat member 30 and the upper seat member 40 is not particularly limited. The upper seat member 40 may be bonded to an upper surface (a surface opposite to the surface from which the first protrusion 23 protrudes) of the vehicle seat member 30 by bonding means such as an appropriate adhesive and a bonding member. Alternatively, the vehicle seat member 30 and the upper seat member 40 may be integrated by covering the vehicle seat 50 with an appropriate cover material in a state where the vehicle seat member 30 and the upper seat member 40 are stacked without using the bonding means. The upper seat member 40 is as already described.

<Fourth Aspect>

The fourth aspect of the present invention relates to
the vehicle seat member 30, wherein
the foamed resin molded body 10 is obtained by in-mold foam molding by using the mold 100; and
(B−A)/B is 13/1000 or less, more preferably 2.5/1000 or more and 13/1000 or less, more preferably 3/1000 or more, more preferably 11/1000 or less, more preferably 10/1000 or less, and more preferably 9/1000 or less, wherein A is an outer dimension of the foamed resin molded body 10 and B is an inner dimension of the mold 100 corresponding to the outer dimension.

In the fourth aspect of the present invention, specific examples of the method of in-mold foam molding by using the mold 100 include the method described in detail in relation with the first aspect of the present invention.

In the fourth aspect of the present invention, examples of the resin constituting the foamed resin molded body 10 include the resin described in detail in relation with the first aspect of the present invention and particularly preferably include the composite resin containing the polystyrene-based resin and the polyolefin-based resin or the polystyrene-based resin. By using this resin, controlling (B−A)/B to be within the aforementioned range can be easy.

In the fourth aspect of the present invention, the foamed resin molded body 10 preferably has an expansion ratio of 10 to 60 times and a fusion rate between the foamed particles derived from the prefoamed resin particles of 50 to 100%. In the foamed resin molded body 10 having such properties, controlling (B−A)/B to be within the aforementioned range can be easy. The more preferable ranges of the expansion ratio and the fusion rate are as exemplified as suitable ranges in relation with the first aspect.

<Fifth Aspect>

The fifth aspect of the present invention relates to
the vehicle seat member 30, wherein
the foamed resin molded body 10 is obtained by packing the prefoamed resin particles obtained by prefoaming the foamable resin particles comprising a resin and a foaming agent into a mold followed by in-mold foam molding;
in the foamed resin molded body 10, an expansion ratio is 10 to 60 times and a fusion rate between the foamed particles derived from the prefoamed resin particles is 50 to 100%; and
the resin is a resin such that when a standard foamed resin molded body is produced by in-mold foam molding by using a standard mold having a cavity with a predetermined shape so that the expansion ratio and the fusion rate are obtained, and removing the standard mold, (D−C)/D is 13/1000 or less, more preferably 2.5/1000 or more and 13/1000 or less, more preferably 3/1000 or more, more preferably 11/1000 or less, more preferably 10/1000 or less, and more preferably 9/1000 or less, wherein C is an outer dimension of the standard foamed resin molded body and D is an inner dimension of the standard mold corresponding to the outer dimension.

In the fifth aspect of the present invention, suitable ranges of the expansion ratio and the fusion rate of the foamed resin molded body 10 are as exemplified as suitable ranges in relation with the first aspect.

In the fifth aspect of the present invention, a value of the expansion ratio and a value of the fusion rate of the standard foamed resin molded body are, assuming that the value of the expansion ratio and the value of the fusion rate of the foamed resin molded body 10 are each 100, preferably 80 to 120, more preferably 90 to 110, particularly preferably 98 to 102, and the most preferably 100. Definition of the fusion rate is as already described in relation with the first aspect of the present invention. The foaming agent, the foamable resin particles containing the resin and the foaming agent, and the prefoamed resin particles obtained by prefoaming the foamable resin particles used for producing the standard foamed resin molded body, are preferably the same as those used for producing the foamed resin molded body 10 as already described in relation with the first aspect.

In the fifth aspect of the present invention, the standard mold having a cavity with the aforementioned predetermined shape is not particularly limited, but examples include the mold used for production of the vehicle seat member 30 and a mold having a cavity with a regular hexahedron shape (a mold having a cavity with a regular hexahedron shape with one side of 10 cm, for example). The standard foamed resin molded body molded by using the standard mold preferably does not have the frame member embedded in it but is made only of the foamed resin.

In the fifth aspect of present invention, examples of the resin constituting the foamed resin molded body 10 include the resin described in detail in relation with the first aspect of the present invention and particularly preferably include the composite resin containing the polystyrene-based resin and the polyolefin-based resin or the polystyrene-based resin.

<Sixth Aspect>

The sixth aspect of the present invention relates to the vehicle seat member 30, wherein the foamed resin molded body 10 is a foamed molded body of a composite resin comprising a polystyrene-based resin and a polyolefin-based resin or a foamed molded body of the polystyrene-based resin.

In the sixth aspect of the present invention, the foamed resin molded body 10 preferably has an expansion ratio of 10 to 60 times, and a fusion rate between the foamed particles derived from the prefoamed resin particles of 50 to 100%. In the foamed resin molded body 10 having such properties, the amount of a change in the position of the protrusions 23 and 25 are particularly small. Moreover, since the dimensional change of the foamed resin molded body 10 in the production step is particularly small, though the frame member 20 is integrally molded inside the foamed resin molded body 10, further higher dimensional accuracy is given. Moreover, since the base end portions 231 and 251 of the protrusions 23 and 25 and the body portion 21 in the frame member 20 are held by the foamed resin molded body surrounding them further firmly as a result of shrinkage of the foamed resin molded body 10 in the production step, the vehicle seat member 30 can be more reliably fastened to the vehicle body through the protrusions 23 and 25. Further suitable ranges of the expansion ratio and the fusion rate are as exemplified as the suitable ranges in relation with the first aspect.

<Seventh Aspect>

The seventh aspect of the present invention relates to the vehicle seat 50 comprising the vehicle seat member 30 according to the fourth aspect, the fifth aspect, or the sixth aspect of the present invention and the upper seat member 40 placed on an upper part of the vehicle seat member 30.

EXAMPLES

Advantage of the present invention will be described below on the basis of experiment results, but the scope of the present invention is not limited to these specific examples.

[Resin Molding Shrinkage Rate]

In a standard foamed resin molded body comprising only the foamed resin without having a frame member embedded in it, which is produced by in-mold foam molding using a standard mold having a cavity with the predetermined shape, (D−C)/D is "resin molding shrinkage rate" of the resin. In this equation, C is the outer dimension of the standard foamed resin molded body and D is the inner dimension of the standard mold corresponding to the outer dimension.

The following Example 1 employed, as the resin with the resin molding shrinkage rate less than 3/1000, a composite resin (polystyrene modified polyphenylene ether resin) comprising the polystyrene resin and the polyphenylene ether resin exhibiting the resin molding shrinkage rate of approximately 2/1000 when the expansion ratio is 40 times and the fusion rate is 98%. This resin molding shrinkage rate was determined by using, as the standard foamed molded body, the foamed resin molded body produced by using the mold 100 used in the following Example 1 as the standard mold and under the same conditions as in the following Example 1 except that the frame member 20 was not used. The fusion rate is a value measured by the following procedure. A cutting line with a depth of approximately 5 mm is made by a cutter knife along the center of the foamed resin molded body. After that, the foamed molded body is divided by the hand into two parts along this cutting line. The number of particles (a) fractured in the particles and the number of particles (h) fractured on an interface between the particles are counted for the foamed particles appearing on the fractured section in a predetermined range of 100 to 150 particles. A value obtained by substituting the results, (a) and (b), in the equation $[(a)/((a)+(b))]\times100$ is defined as the fusion rate (%). The same applies to the following fusion rate.

The following Example 2 employed, as the resin with the resin molding shrinkage rate of 3/1000 or more and 13/1000 or less, a polystyrene-based resin exhibiting the resin molding shrinkage rate of approximately 3/1000 when the expansion ratio is 30 times and the fusion rate is 98%. This resin molding shrinkage rate was determined by using, as the standard foamed molded body, the foamed resin molded body produced by using the mold 100 used in the following Example 2 as the standard mold and under the same conditions as in the following Example 2 except that the frame member 20 was not used.

The following Example 3 employed, as the resin with the resin molding shrinkage rate of 3/1000 or more and 13/1000 or less, a composite resin (Piocelan (registered trademark): OP-30EU, manufactured by Sekisui Plastics Co., Ltd.) of the polystyrene-based resin and the polyolefin-based resin exhibiting the resin molding shrinkage rate of approximately 8/1000 when the expansion ratio is 30 times and the fusion rate is 98%. This resin molding shrinkage rate was determined by using, as the standard foamed molded body, the foamed resin molded body produced by using the mold 100 used in the following Example 3 as the standard mold and under the same conditions as in the following Example 3 except that the frame member 20 was not used.

The following Comparative Example 1 employed, as the resin with the resin molding shrinkage rate larger than 13/1000, a polypropylene-based resin exhibiting the resin molding shrinkage rate of approximately 18/1000 when the expansion ratio is 30 times and the fusion rate is 98%. This resin molding shrinkage rate was determined by using, as the standard foamed molded body, the foamed resin molded body produced by using the mold 100 used in the following Comparative Example as the standard mold and under the same conditions as in the following Comparative Example 1 except that the frame member 20 was not used.

Example 1

The vehicle seat member 30 described in the embodiment was produced by in-mold foam molding. The mold 100 used had the inner dimension (inner dimension B in FIG. 5) corresponding to the width of the vehicle seat member 30 in a longer-side direction of 1262.5 mm. As the foamed resin, the aforementioned polystyrene modified polyphenylene ether resin with the resin molding shrinkage rate of approximately 2/1000 was used. For the frame member 20, an iron wire (SWM-B) with a diameter of 4.5 mm was used. When the aforementioned mold 100 is used, assuming that the outer dimension after molding of the foamed resin molded body 10 containing the frame member 20 is smaller than the inner dimension of the mold 100 by 2/1000, the width (outer dimension A in FIG. 6) of the foamed resin molded body 10 in the longer-side direction is 1260 mm. Similarly, the inner dimension of the mold 100 is designed so that a width of the foamed resin molded body 10 in a shorter-side direction is 550 mm, and a thickness is 160 mm. In the product standard, an allowable value of the width (outer dimension A) of the foamed resin molded body 10 in the longer-side direction is 1260 mm±6 mm.

The frame member 20 was placed substantially at a center part in the thickness direction of the foamed resin molded body 10 constituting the vehicle seat member 30 and at a position approximately 30 mm inward from the outer peripheral surface of the foamed resin molded body 10 along the entire periphery. On the portion 22 of the body portion 21 that lies along a side surface of the foamed resin molded body 10 in the longer-side direction, two first protrusions 23 and 23 were formed at a distance of 700 mm between apexes, and one second protrusion 25 was also formed at the center part of the portion 24 of the body portion 20 that lies along another side surface of the foamed resin molded body 10 in the longer-side direction.

The prefoamed resin particles (bulk expansion ratio of 40 times) of the polystyrene modified polyphenylene ether resin were produced by the following procedure. Into an autoclave with a volume of 5 liters, 1600 g of the polystyrene modified polyphenylene ether resin (assuming that the total of the polystyrene resin and the polyphenylene ether resin is 100 mass parts, the content of the polyphenylene ether is approximately 50 mass parts, Tg; approximately 145° C.), 2500 g of water, and 32 g of magnesium oxide were put, and under stirring in a sealed state, 80 g of n-butane was pressed into the autoclave for impregnation. After that, the temperature rose to 120° C., and this temperature was maintained for 15 hours. The pressure at that time was 14 kg/cm². After that, the resultant was cooled to 30° C. and taken out. These bead-shaped base resin particles were washed, dewatered, and dried and then, put into a sealed container and held/matured for 72 hours at a temperature of a cool box (15° C.) to obtain the foamable resin particles. The content of n-butane in the bead-shaped base resin particles was 2.5 mass parts. The bead-shaped foamable resin particles were put into a pressure foaming machine and heated by water vapor for foaming, and the bulk density was adjusted to 0.025 g/cm³ and left for 24 hours for maturation. The prefoamed resin particles (bulk expansion ratio of 40 times) of the polystyrene modified polyphenylene ether resin were thus produced.

The aforementioned prefoamed resin particles (bulk expansion ratio of 40 times) were packed into the mold 100 in which the frame member 20 was placed in the cavity and the mold was closed, and the inside of the cavity in the mold 100 was heated by water vapor for foaming, the gaps between the prefoamed resin particles were filled, and the prefoamed resin particles were fused to each other and integrated, and the mold was removed to produce the vehicle seat member 30. The expansion ratio of the foamed resin molded body 10 was 40 times and the fusion rate was 98% at that time.

After 24 hours had elapsed since the demolding, the outer dimension of the foamed resin molded body 10 in the vehicle seat member 30 was measured.

The aforementioned operation was carried out 10 times, and ten pieces of the vehicle seat members 30 were produced.

In all the ten produced vehicle seat members 30, the width (outer dimension A) of the foamed resin molded body 10 in the longer-side direction was within the range of 1260 mm±6 mm which was an allowable value and satisfied a product standard.

On the other hand, in the produced vehicle seat member 30, a force required for pulling out the first protrusion 23 from the foamed resin molded body 10 was referred to as "pulling-out strength." The pulling-out strength was measured such that, after 24 hours had elapsed since the demolding, a push-pull gauge was set on the first protrusion 23, and the first protrusion 23 was pulled in a state where the foamed resin molded body 10 was fixed. On the other hand, fastening strength (vehicle fastening strength) of the vehicle seat member 30 to the vehicle through the first protrusion 23 is specified separately. The pulling-out strength measured after 24 hours had elapsed since the demolding and the required vehicle fastening strength were compared for the ten vehicle seat members 30, and the pulling-out strength was lower than the vehicle fastening strength in all the cases.

Example 2

The vehicle seat member 30 described in the embodiment was produced by in-mold foam molding. The mold 100 used had the inner dimension (inner dimension B in FIG. 5) corresponding to the width of the vehicle seat member 30 in the longer-side direction of 1263.8 mm. As the foamed resin, the aforementioned polystyrene-based resin with the resin molding shrinkage rate of approximately 3/1000 was used. When the aforementioned mold 100 is used, assuming that the outer dimension after molding of the foamed resin molded body 10 containing the frame member 20 is smaller than the inner dimension of the mold 100 by 3/1000, the width (outer dimension A in FIG. 6) of the foamed resin molded body 10 in the longer-side direction is 1260 mm. Similarly, the inner dimension of the mold 100 is designed so that the width of the foamed resin molded body 10 in a shorter-side direction is 550 mm, and the thickness is 160 mm. In the product standard, an allowable value of the width (outer dimension A) of the foamed resin molded body 10 in the longer-side direction is 1260 mm±6 mm.

The frame member 20 same as that in Example 1 was used.

The prefoamed resin particles (bulk expansion ratio of 30 times) of the polystyrene-based resin were produced by the same procedure as for the prefoamed resin particles in Example 1 except that the resin and the bulk expansion ratio were different.

The prefoamed resin particles (bulk expansion ratio of 30 times) of the polystyrene-based resin were packed into the mold 100 in which the frame member 20 was placed in the cavity in the same way as Example 1 and the mold was closed, and the inside of the cavity in the mold 100 was heated by water vapor for foaming, the gaps between the prefoamed resin particles were filled, and the prefoamed resin particles were fused to each other and integrated, and the mold was removed to produce the vehicle seat member 30. The expansion ratio of the foamed resin molded body 10 was 30 times and the fusion rate was 98% at that time.

After 24 hours had elapsed since the demolding, the outer dimension of the foamed resin molded body 10 in the vehicle seat member 30 was measured.

The aforementioned operation was carried out 10 times, and ten pieces of the vehicle seat members 30 were produced.

In all the ten produced vehicle seat members 30, the width (outer dimension A) of the foamed resin molded body 10 in the longer-side direction was within the range of 1260 mm±6 mm which is an allowable value and satisfied the product standard.

The pulling-out strength measured after 24 hours had elapsed since the demolding and the required vehicle fastening strength were compared for the ten vehicle seat members 30, and the pulling-out strength was higher than the vehicle fastening strength in all the cases. This is considered to be a result of a fact that the base end portions 231 and 251 of the protrusions 23 and 25 and the body portion 21 in the frame member 20 are held by the foamed resin molded body 10 surrounding them with sufficient strength as a result of shrinkage of the foamed resin molded body 10 in the production step.

For one of the produced vehicle seat members 30, the outer dimension of the foamed resin molded body 10 was measured after 24 hours had elapsed since the demolding. The width (outer dimension A in FIG. 6) of the foamed resin molded body 10 in the longer-side direction was 1260 mm, and the width in the shorter-side direction was 550 mm. That is, assuming that the outer dimension in the foamed resin molded body 10 is A and the inner dimension of the mold 100 corresponding to the outer dimension is B, (B−A)/B was 3/1000. Moreover, after 24 hours had elapsed since the demolding, a distance between the apexes of the two first protrusions 23 and 23 was measured, and it was 699.0 mm. A change rate of the distance ([(distance before molding)−(distance after demolding)]/(distance before molding)) was 1/1000.

Example 3

The vehicle seat member 30 described in the embodiment was produced by in-mold foam molding. The mold 100 used had the inner dimension (inner dimension B in FIG. 5) corresponding to the width of the vehicle seat member 30 in the longer-side direction of 1270.1 mm. As the foamed resin, the aforementioned composite resin of the polystyrene-based resin and the polyolefin-based resin with the resin molding shrinkage rate of approximately 8/1000 was used. When the aforementioned mold 100 is used, assuming that the outer dimension after molding of the foamed resin molded body 10 containing the frame member 20 is smaller than the inner dimension of the mold 100 by 8/1000, the width (outer dimension A in FIG. 6) of the foamed resin molded body 10 in the longer-side direction is 1260 mm. Similarly, the inner dimension of the mold 100 is designed so that the width of the foamed resin molded body 10 in a shorter-side direction is 550 mm, and the thickness is 160 mm. In the product standard, an allowable value of the width (outer dimension A) of the foamed resin molded body 10 in the longer-side direction is 1260 mm±6 mm.

The frame member 20 same as that in Example 1 was used.

The prefoamed resin particles (bulk expansion ratio of 30 times) of the composite resin of the polystyrene-based resin and the polyolefin-based resin were produced by the same procedure as for the prefoamed resin particles used in Example 1 except that the resin and the bulk expansion ratio were different.

The prefoamed resin particles (bulk expansion ratio of 30 times) of the composite resin were packed into the mold 100 in which the frame member 20 was placed in the cavity in the same way as in Example 1 and the mold was closed, and the inside of the cavity in the mold 100 was heated by water vapor for foaming, the gaps between the prefoamed resin particles were filled, and the prefoamed resin particles were fused to each other and integrated, and the mold was removed to produce the vehicle seat member 30. The expansion ratio of the foamed resin molded body 10 was 30 times and the fusion rate was 98% at that time.

After 24 hours had elapsed since the demolding, the outer dimension of the foamed resin molded body 10 in the vehicle seat member 30 was measured.

The aforementioned operation was carried out 10 times, and ten pieces of the vehicle seat members 30 were produced.

In all the ten produced vehicle seat members 30, the width (outer dimension A) of the foamed resin molded body 10 in the longer-side direction was within the range of 1260 mm±6 mm which is an allowable value and satisfied the product standard.

The pulling-out strength measured after 24 hours had elapsed since the demolding and the required vehicle fastening strength were compared for the ten vehicle seat members 30, and the pulling-out strength was higher than the vehicle fastening strength in all the cases. This is considered to be a result of a fact that the base end portions 231 and 251 of the protrusions 23 and 25 and the body portion 21 in the frame member 20 are held by the foamed resin molded body 10 surrounding them with sufficient strength as a result of shrinkage of the foamed resin molded body 10 in the production step.

For one of the produced vehicle seat members 30, the outer dimension of the foamed resin molded body 10 was measured after 24 hours had elapsed since the demolding. The width (outer dimension A in FIG. 6) of the foamed resin molded body 10 in the longer-side direction was 1260 mm, and the width in the shorter-side direction was 550 mm. That is, assuming that the outer dimension in the foamed resin molded body 10 is A and the inner dimension of the mold 100 corresponding to the outer dimension is B, (B−A)/B was 8/1000. Moreover, after 24 hours had elapsed since the demolding, a distance between the apexes of the two first protrusions 23 and 23 was measured, and it was 696.5 mm.

A change rate of the distance ([(distance before molding)−(distance after demolding)]/(distance before molding)) was 5/1000.

Comparative Example 1

The vehicle seat member 30 described in the embodiment was produced by in-mold foam molding. The mold 100 used had the inner dimension (inner dimension B in FIG. 5) corresponding to the width of the vehicle seat member 30 in the longer-side direction of 1282.7 mm. As the foamed resin, the aforementioned polypropylene-based resin with the resin molding shrinkage rate of approximately 18/1000 was used. When the aforementioned mold 100 is used, assuming that the outer dimension after molding of the foamed resin molded body 10 containing the frame member 20 is smaller than the inner dimension of the mold 100 by 18/1000, the width (outer dimension A in FIG. 6) of the foamed resin molded body 10 in the longer-side direction is 1260 mm. Similarly, the inner dimension of the mold 100 is designed so that the width of the foamed resin molded body 10 in a shorter-side direction is 550 mm, and the thickness is 160 mm. In the product standard, an allowable value of the width (outer dimension A) of the foamed resin molded body 10 in the longer-side direction is 1260 mm±6 mm.

The frame member 20 same as that in Example 1 was used.

The prefoamed resin particles (bulk expansion ratio of 30 times) of the polypropylene-based resin were produced by the same procedure as for the prefoamed resin particles used in Example 1 except that the resin and the bulk expansion ratio were different.

The prefoamed resin particles (bulk expansion ratio of 30 times) of the polypropylene-based resin were packed into the mold 100 in which the frame member 20 was placed in the cavity in the same way as in Example 1 and the mold was closed, and the inside of the cavity in the mold 100 was heated by water vapor for foaming, the gaps between the prefoamed resin particles were filled, and the prefoamed resin particles were fused to each other and integrated, and the mold was removed to produce the vehicle seat member 30. The expansion ratio of the foamed resin molded body 10 was 30 times and the fusion rate was 98% at that time.

After 24 hours had elapsed since the demolding, the outer dimension of the foamed resin molded body 10 in the vehicle seat member 30 was measured.

The aforementioned operation was carried out 10 times, and ten pieces of the vehicle seat members 30 were produced.

In only two of the ten produced vehicle seat members 30, the width (outer dimension A) of the foamed resin molded body 10 in the longer-side direction was within the range of 1260 mm±6 mm which is an allowable value, and satisfied the product standard. In the remaining eight, the width was out of the range of 1260 mm±6 mm and did not satisfy the product standard.

The pulling-out strength measured after 24 hours had elapsed since the demolding and the required vehicle fastening strength were compared for the ten vehicle seat members 30, and the pulling-out strength was lower than the vehicle fastening strength for some of them. This suggests that the foamed molded body 10 using the resin with the resin molding shrinkage rate of approximately 18/1000 cannot hold the base end portions 231 and 251 of the protrusions 23 and 25 and the body portion 21 in the frame member 20 with sufficient strength in some cases.

Moreover, after 24 hours had elapsed since the demolding, a distance between the apexes of the two first protrusions 23 and 23 was measured, and it was 694.5 mm. A change rate of the distance ([(distance before molding)−(distance after demolding)]/(distance before molding)) was 7.9/1000.

REFERENCE SIGNS LIST 10 foamed resin molded body
20 frame member
21 body portion of frame member
23 first protrusion
25 second protrusion
30 vehicle seat member
40 upper seat member
50 vehicle seat All the publications, patents, and patent applications referred to in this Description are incorporated in this Description as they are by reference.

The invention claimed is:

1. A method for producing a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion, having a tip end that protrudes outward from the foamed resin molded body and having a base end portion embedded in the foamed resin molded body, the method comprising:

an in-mold foam molding step of placing the frame member in a mold so that the body portion is located inside the mold, packing prefoamed resin particles obtained by prefoaming foamable resin particles comprising a resin and a foaming agent and then, foaming the prefoamed resin particles in the mold to mold the foamed resin molded body; and a demolding step of removing the mold to obtain the vehicle seat member, wherein, in the in-mold foam molding step, the foamed resin molded body is molded so that, where A is an outer dimension of the foamed resin molded body in the vehicle seat member obtained by the demolding step and B is an inner dimension of the mold corresponding to the outer dimension of the foamed resin molded body, an inequation: $2.5/1000 \leq (B-A)/B \leq 13/1000$ is satisfied.

2. The method according to claim 1, wherein the foamed resin molded body is rectangular in a plan view, the body portion of the frame member partially has a portion lying along a longitudinal direction of the foamed resin molded body, and the protrusion is formed on the portion lying along the longitudinal direction of the foamed resin molded body.

3. A method for producing a vehicle seat comprising a vehicle seat member and an upper seat member placed on an upper part of the vehicle seat member, the vehicle seat member comprising a foamed resin molded body and a frame member integrally molded with the foamed resin molded body, the frame member including a body portion and a protrusion, the body portion being embedded in the foamed resin molded body, and the protrusion protruding from the body portion, having a tip end that protrudes outward from the foamed resin molded body and having a base end portion embedded in the foamed resin molded body, the upper seat member comprising a cushion material elastically deformable upon application of a load, and the foamed resin molded body in the vehicle seat member having compression strength higher than that of the upper seat member, the method comprising:

a vehicle seat member production step of producing the vehicle seat member by a method according to claim 2; and a vehicle seat production step of producing the vehicle seat by placing the upper seat member on the upper part of the vehicle seat member obtained by the vehicle seat member production step.

4. A method for producing a vehicle seat member comprising a foamed resin molded body and a frame member integrally molded with the foamed resin molded body, the frame member including a body portion and a protrusion, the body portion being embedded in the foamed resin molded body, and the protrusion protruding from the body portion, having a tip end that protrudes outward from the foamed resin molded body and having a base end portion embedded in the foamed resin molded body, the method comprising:

an in-mold foam molding step of placing the frame member in a mold so that the body portion is located inside the mold, packing prefoamed resin particles obtained by prefoaming foamable resin particles comprising a resin and a foaming agent and then, foaming the prefoamed resin particles in the mold to mold the foamed resin molded body; and a demolding step of removing the mold to obtain the vehicle seat member, wherein:

the in-mold foam molding step includes molding the foamed resin molded body so that an expansion ratio is 10 to 60 times and a fusion rate between foamed particles derived from the prefoamed resin particles is 50 to 100%; and the resin is constituted such that when a standard foamed resin molded body is produced by in-mold foam molding by using a standard mold having a cavity with a predetermined shape so that the expansion ratio and the fusion rate are obtained, and removing the standard mold, where C is an outer dimension of the standard foamed resin molded body and D is an inner dimension of the standard mold corresponding to the outer dimension of the standard foamed resin molded body, an inequation: $2.5/1000 \leq (D-C)/D \leq 13/1000$ is satisfied.

5. The method according to claim 4, wherein the foamed resin molded body is rectangular in a plan view, the body portion of the frame member partially has a portion lying along a longitudinal direction of the foamed resin molded body, and the protrusion is formed on the portion lying along the longitudinal direction of the foamed resin molded body.

6. A method for producing a vehicle seat comprising a vehicle seat member and an upper seat member placed on an upper part of the vehicle seat member, the vehicle seat member comprising a foamed resin molded body and a frame member integrally molded with the foamed resin molded body, the frame member including a body portion and a protrusion, the body portion being embedded in the foamed resin molded body, and the protrusion protruding from the body portion, having a tip end that protrudes outward from the foamed resin molded body and having a base end portion embedded in the foamed resin molded body, the upper seat member comprising a cushion material elastically deformable upon application of a load, and the foamed resin molded body in the vehicle seat member having compression strength higher than that of the upper seat member, the method comprising:

a vehicle seat member production step of producing the vehicle seat member by a method according to claim 4; and a vehicle seat production step of producing the vehicle seat by placing the upper seat member on the upper part of the vehicle seat member obtained by the vehicle seat member production step.

7. A method for producing a vehicle seat comprising a vehicle seat member and an upper seat member placed on an upper part of the vehicle seat member, the vehicle seat member comprising a foamed resin molded body and a frame member integrally molded with the foamed resin molded body, the frame member including a body portion and a protrusion, the body portion being embedded in the foamed resin molded body, and the protrusion protruding from the body portion, having a tip end that protrudes outward from the foamed resin molded body and having a base end portion embedded in the foamed resin molded body, the upper seat member comprising a cushion material elastically deformable upon application of a load, and the foamed resin molded body in the vehicle seat member having compression strength higher than that of the upper seat member, the method comprising:

a vehicle seat member production step of producing the vehicle seat member by a method according to claim 1; and a vehicle seat production step of producing the vehicle seat by placing the upper seat member on the upper part of the vehicle seat member obtained by the vehicle seat member production step.

8. A vehicle seat member comprising:

a foamed resin molded body; and a frame member integrally molded with the foamed resin molded body, the frame member including a body portion and a protrusion, the body portion being embedded in the foamed resin molded body, and the protrusion protruding from the body portion, having a tip end that protrudes outward from the foamed resin molded body and having a base end portion embedded in the foamed resin molded body, wherein:

the body portion of the frame member is embedded in a position inward from an outer peripheral surface of the foamed resin molded body along an entirety of the outer peripheral surface of the foamed resin molded body;

the foamed resin molded body is obtained by in-mold foam molding by using a mold; and where A is an outer dimension of the foamed resin molded body and B is an inner dimension of the mold corresponding to the outer dimension of the foamed resin molded body, an inequation: $2.5/1000 \leq (B-A)/B \leq 13/1000$ is satisfied.

9. A vehicle seat comprising a vehicle seat member according to claim 8 and an upper seat member placed on an upper part of the vehicle seat member, the upper seat member comprising a cushion material elastically deformable upon application of a load, and the foamed resin molded body in the vehicle seat member having compression strength higher than that of the upper seat member.

10. The vehicle seat member according to claim 8, wherein the foamed resin molded body is rectangular in a plan view, the body portion of the frame member partially has a portion lying along a longitudinal direction of the foamed resin molded body, and the protrusion is formed on the portion lying along the longitudinal direction of the foamed resin molded body.

11. A vehicle seat comprising a vehicle seat member according to claim 10 and an upper seat member placed on an upper part of the vehicle seat member, the upper seat member comprising a cushion material elastically deformable upon application of a load, and the foamed resin molded body in the vehicle seat member having compression strength higher than that of the upper seat member.

12. The vehicle seat member according to claim 8, wherein the foamed resin molded body is a foamed molded body of a composite resin comprising a polystyrene-based resin and a polyolefin-based resin or a foamed molded body of the polystyrene-based resin.

13. The vehicle seat member according to claim 12, wherein the foamed resin molded body is rectangular in a plan view, the body portion of the frame member partially has a portion lying along a longitudinal direction of the foamed resin molded body, and the protrusion is formed on the portion lying along the longitudinal direction of the foamed resin molded body.

14. A vehicle seat comprising a vehicle seat member according to claim 12 and an upper seat member placed on an upper part of the vehicle seat member, the upper seat member comprising a cushion material elastically deformable upon application of a load, and the foamed resin molded body in the vehicle seat member having compression strength higher than that of the upper seat member.

15. A vehicle seat member comprising:
a foamed resin molded body; and
a frame member integrally molded with the foamed resin molded body, the frame member including a body portion and a protrusion, the body portion being embedded in the foamed resin molded body, and the protrusion protruding from the body portion, having a tip end that protrudes outward from the foamed resin molded body and having a base end portion embedded in the foamed resin molded body,
wherein:
the foamed resin molded body is obtained by packing prefoamed resin particles obtained by prefoaming foamable resin particles comprising a resin and a foaming agent into a mold followed by in-mold foam molding;
in the foamed resin molded body, an expansion ratio is 10 to 60 times and a fusion rate between foamed particles derived from the prefoamed resin particles is 50 to 100%; and
the resin is constituted such that when a standard foamed resin molded body is produced by in-mold foam molding by using a standard mold having a cavity with a predetermined shape so that the expansion ratio and the fusion rate are obtained, and removing the standard mold, where C is an outer dimension of the standard foamed resin molded body and D is an inner dimension of the standard mold corresponding to the outer dimension of the standard foamed resin molded body, an inequation: $2.5/1000 \leq (D-C)/D \leq 13/1000$ is satisfied.

16. The vehicle seat member according to claim 15, wherein the foamed resin molded body is a foamed molded body of a composite resin comprising a polystyrene-based resin and a polyolefin-based resin or a foamed molded body of the polystyrene-based resin.

17. The vehicle seat member according to claim 15, wherein the foamed resin molded body is rectangular in a plan view, the body portion of the frame member partially has a portion lying along a longitudinal direction of the foamed resin molded body, and the protrusion is formed on the portion lying along the longitudinal direction of the foamed resin molded body.

18. A vehicle seat comprising a vehicle seat member according to claim 15 and an upper seat member placed on an upper part of the vehicle seat member, the upper seat member comprising a cushion material elastically deformable upon application of a load, and the foamed resin molded body in the vehicle seat member having compression strength higher than that of the upper seat member.

\* \* \* \* \*